(12) United States Patent
Shinohara

(10) Patent No.: US 6,721,324 B1
(45) Date of Patent: Apr. 13, 2004

(54) SWITCH CONTROL SYSTEM IN ATM SWITCHING SYSTEM

(75) Inventor: Masayuki Shinohara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/339,441

(22) Filed: Jun. 24, 1999

(30) Foreign Application Priority Data

Jun. 26, 1998 (JP) .............................. 10-180336

(51) Int. Cl.[7] .............................................. H04L 12/28
(52) U.S. Cl. ..................... 370/395.1; 370/415
(58) Field of Search ................... 370/230, 236, 370/238.1, 244, 250, 253, 299, 301, 310.1, 312, 352, 353, 356, 360, 368, 389, 395.1, 395.3, 395.42, 395.51, 902, 905, 413, 415, 417, 229, 395.4, 395.71

(56) References Cited

U.S. PATENT DOCUMENTS 5,509,008 A * 4/1996 Genda et al. ............... 370/219
5,550,823 A * 8/1996 Irie et al. .................... 370/413
5,896,381 A * 4/1999 Imai ........................... 370/398
6,067,298 A * 5/2000 Shinohara ................... 370/236
6,157,645 A * 12/2000 Shobatake .............. 370/395.41
6,259,698 B1 * 7/2001 Shin et al. ................... 370/235
6,563,837 B2 * 5/2003 Krishna et al. ............. 370/413

* cited by examiner

*Primary Examiner*—Chi Pham
*Assistant Examiner*—Alexander O. Boakye
(74) *Attorney, Agent, or Firm*—Dickstein, Shapiro, Morin & Oshinsky, LLP.

(57) ABSTRACT

In candidate selection to select the queue issuing the connection request to a certain output port out of a plurality of logic queues provided in an input buffer section of an input buffer type ATM switching system to store cells for each output port and each connection, whether a logic queue holds cells in predetermined order is checked, and the logic queue located next to the queue to which gained the right to connect to an output port last time is taken as a start point of the rotation priority control to select the logic queue holding the cell searched first.

14 Claims, 27 Drawing Sheets

FIG.24

| SERVICE CLASS #1 | OUTPUT PORT NUMBER #1 | OUTPUT PORT NUMBER #2 | OUTPUT PORT NUMBER #3 | OUTPUT PORT NUMBER #4 | OUTPUT PORT NUMBER #5 |
|---|---|---|---|---|---|
| INPUT PORT NUMBER #1 | "0" | "1" | "1" | "0" | "1" |
| INPUT PORT NUMBER #2 | "1" | "1" | "0" | "0" | "1" |
| INPUT PORT NUMBER #3 | "0" | "1" | "0" | "0" | "0" |
| INPUT PORT NUMBER #4 | "0" | "1" | "1" | "0" | "1" |
| INPUT PORT NUMBER #5 | "1" | "1" | "0" | "0" | "1" |

21-1a

SWITCH CONTROL SYSTEM IN ATM SWITCHING SYSTEM

BACKGROUND OF THE INVENTION

The present invention relates to an ATM switching system, which exchanges an ATM cell between specific input port, and output port based on ATM (Asynchronous Transfer Mode) technology. More specifically, the invention relates to the switch control technique in an input buffer type switch.

FIG. 26 indicates a block diagram showing an example of the configuration of a conventional ATM switching system. Referring to FIG. 26, the conventional ATM switching system comprises a crossbar type switch section 20 which exchanges an ATM cell (hereinafter called a cell), input buffer sections 10-1 to 10-n which store the cell arrived at input ports (input buffer sections 10-3 to 10-n are not shown) and an arbiter section 2. The switch exchange 22 of the crossbar type switch section 20 closes (turns on) the cross point 22-2 of grid-like transmission lines, thereby exchanging a cell between specific input highway 23 and output highway 24. If two or more input ports 100-1 to 100-n send a cell to a specific output port 101-1 to 101-n, collision will occur between the cells and the cell data is broken. Therefore, the number of input ports to send a cell to a specific output port must be limited to only one.

The input buffer sections 10-1 to 10-n provided for each input port and each output port has one FIFO (First In First Out) logic queue 1. Cells arrived at the input port of 100-1 to 100-n are stored at the end of the FIFO logic queue 1, and the cells stored on the FIFO logic queue 1 are sequentially sent to the input highway 23.

The input buffer sections 10-1 to 10-n send a connection request signal 30 holding information about the output ports 101-1 to 101-n to which a cell is transferred to the arbiter section 2.

The arbiter section 2 determines the cross point 22-2 of the switch exchange 22 at which the switch is closed based on the connection request signal 30 to prevent collision between cells. The arbiter section 2 generates a competition arbitration signal 31 which notifies the arbitration result to the input buffer sections 10-1 to 10-n.

Operation of the conventional ATM switching system shown in FIG. 26 is explained. Cells arrived at the input port 100-1 to 100-n are stored at the end of the FIFO logic queue 1. The input ports 100-1 to 100-n detect the destination output ports 101-1 to 101-n based on the header information held by the first cell in the FIFO logic queue, and requests the arbiter section 2 to connect to the destination output port.

After integrating the connection request signal 30 from the input buffer sections 10-1 to 10-n, when two or more input ports 100-1 to 100-n request connection to one of the output ports 101-1 to 101-n, namely when competition for one destination occurs, the arbiter section 2 arbitrates the competition and gives the arbiter section 2 the connection right to only one output port.

The arbiter section 2 gives the connection right to any output port that receives the connection request from only one input port.

After arbitration for all output ports, the arbiter section notifies the input buffer sections 10-1 to 10-n of success or failure of the request using a competition arbitration signal 31.

The input buffers 10-1 to 10-n whose request is succeeded sends the first cell to the input highway 23. Based on the arbitration result from the arbiter section 2, the switch exchange 22 closes the specified cross point 22-2 and transfers said first cell to the specified output highway 24.

Problems with the above-mentioned conventional ATM switching system are described. FIG. 27 shows the exemplary operation of the conventional ATM switching system in FIG. 26.

FIG. 27 depicts the state that the first cell at the input port #1 obtains the connection right to the output port #3 and the cross point of the switch exchanger 22 (shown in hatched square) is closed. The first cells at other input ports #2, #3 and #4 request connection to the output port #3 but do not gain the connection right, and they are in the not-transferred state.

At this time, for the cell stored next to the first cell at other input port (the first cell requesting connection to the output port #3), though the input highway 23 is not used and the destination output highway is also idle, transfer is impossible because the first cell is closed. Such state of cell is called "HOL (Head Of Line) blocking" which causes throughput decrease or cell loss.

Even with the configuration in which logic queues equivalent to output ports are provided in the input buffer section and input cells are stored separately for the logic queues corresponding to the destination output obtained from the cell header information, the connection request signal 30 from the input buffer section can convey the connection request to only one output port, and if that connection request is rejected, throughput will be decreased.

Moreover, in the prior art, as a logic queue to send a cell is selected in the input buffer section, regardless of whether the logic queue which issued the connection request last time gains the connection right or not, the logic queues are periodically checked for storage of cells sequentially from the queue positioned next to the queue which issued the connection request last time, and the queue storing the cell searched first is selected.

In this conventional selection system, the logic queues selected in all input buffers are apt to request the same output port as a destination, and competition occurs frequently and throughput is restricted.

Further, as the port speed increases, the time to send a cell is absolutely reduced, and arbitration for the cell to be sent next must be completed within this reduced time, and the arbiter section has to use a large capacity high speed processor.

SUMMARY OF THE INVENTION

In view of the above-mentioned problems, the objective of the present invention is to provide a switch control system in an input buffer type ATM switching system which prevents occurrence of blocking, improves throughput and reduces cell loss.

Furthermore, the objective of the present invention is to provide a switch control system which enables a small capacity processor to perform candidate selection to determine from which input buffer the connection right is issued to which output port, and competition arbitration to determine to which input port the connection right is given when competition occurs for one output port.

The object of the present invention is achieved by the switch control system of ATM switching system which exchanges an ATM cell between an input port and an output port; the input buffer type ATM switching system comprising an input buffer section installed for each input port, an arbiter section to determine to which input port the connection right is given, or which the cross point of a crossbar type switch is to be turned on/off, and a crossbar type switch to exchange an ATM(asynchronous transfer mode) cell between an input port and an output port; wherein the logic queue located next to the queue which gained the output port connection right last time is taken as a start point of rotation priority control which checks whether a logic queue holds cells in the predetermined order, and selects the logic queue holding the cell searched first, in the candidate selection process to select the logic queue issuing the connection request to a certain output port out of a plurality of logic queues provided in said input buffer section to store input cells for each output port or each connection, when determining the logic queue in said input buffer section from which a cell is transferred. Further, in the switch control system of the ATM switching system of the present invention, the input port positioned next to the input port which gained the output port connection right last time is taken as a start point of said rotation priority control which checks whether the connection request is issued from respective input port in the predetermined order and selects the input port issuing the connection request searched first, in the competition arbitration process to determine the input port to be given the connection right, when the connection requests issued by said plurality of input ports are concentrated to the same output port.

BRIEF DESCRIPTION OF THE DRAWINGS

This and other objects, features and advantages of the present invention will become more apparent upon a reading of the following detailed description and drawings, in which:

FIG. 24 is a state diagram explaining the candidate selection process in the second embodiment of the present invention;

DESCRIPTION OF THE EMBODIMENTS

Figure 1:
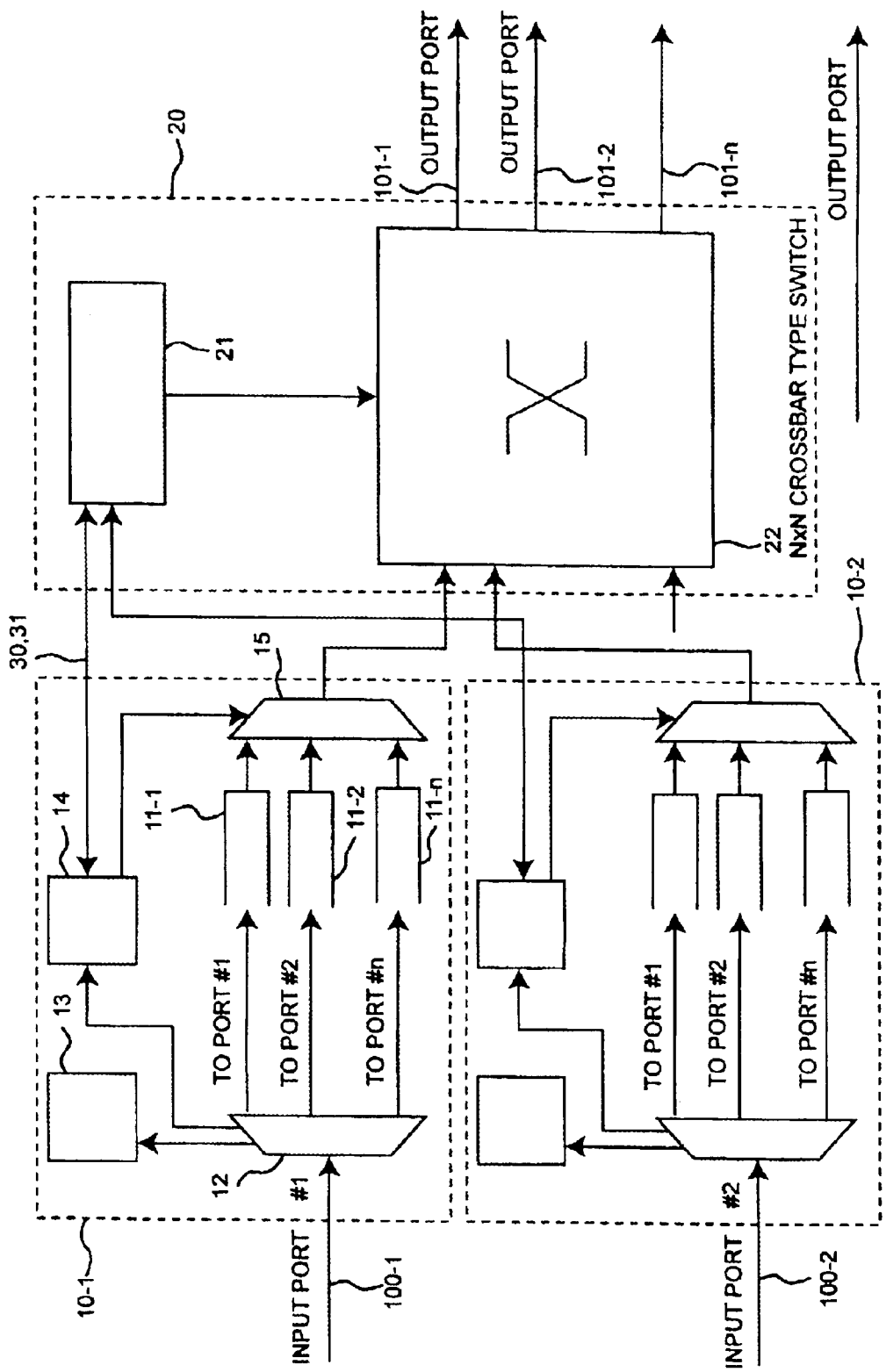
FIG. 1 is a block diagram showing the configuration of an embodiment of the present invention.

An embodiment of the present invention is described below. In a preferred embodiment, the ATM switching system implementing the present invention is the input buffer type ATM switching system comprising an input buffer section (10) installed for each input port (100), an arbiter section (21) to determine to which input port the output port connection right is given, or which cross point of a crossbar type switch is to be turned on/off, and a switch exchange (22) to exchange an ATM cell between an input port and an output port; wherein the logic queue positioned next to the queue which gained the output port connection right last time is taken as a search start point of rotation priority which checks whether a logic queue holds cells in the predetermined order, and selects the logic queue holding the cell searched first, in the candidate selection process in which the input buffer (10) selects the logic queue issuing a connection request to a certain output port (101) out of a plurality of logic queues (11-1 to 11-n) which store input cells for each output port and each connection.

Further, in the present invention, the input port positioned next to the input port which gained the output port connection right last time is taken as a search start point of rotation priority control which checks whether the connection request is issued from an input port in the predetermined order and selects the input port issuing the connection request searched first, in the competition arbitration process to determine the input port to be given the connection right, when the connection requests issued by said plurality of input port are concentrated to same output port in the arbiter (21).

In the embodiment of the present invention, each input buffer section (10) executes said candidate selection process several times when determining the input port to be given the connection right to a certain output port; the plurality of logic queues selected by said candidate selection process assign the order to their destination output ports, and notifies them to the arbiter section (21); the arbiter section (21) executes said competition arbitration process in the order of candidates and determines the connection right to each output port, and returns the result of said competition arbitration process to said input buffer section, and then resets the information about the connection request notified from each input buffer section.

In said competition arbitration process in the order of candidates, if the connection requests belonging to different priority service classes compete for the same output port, the arbiter section (20) gives the connection right preferentially to the connection request which belongs to the highest priority service class.

The embodiment of the present invention may also be configured so that each input buffer section (10) executes said candidate selection several times when determining the input port to be given the connection right to a certain output port; the plurality of logic queues selected by said candidate selection process does not assign the order to their request destination output ports, and notifies them to the arbiter section (20); the arbiter section (20) searches all connection requests on the information table indicating from which input port the connection request is issued to which output port, and executes said competition arbitration in the order of candidates and determines the connection right to each output port, and returns the result of said competition arbitration process to the input buffer section, and then resets the information about the connection request notified from each input buffer section.

The arbiter section (20) has an information table (a connection request status control memory 21-1a) for each service class, controls the connection requests for each service class on this information table, and execute said competition arbitration process sequentially from said information table of the highest priority service class, thereby determining the connection right to each output port, and executes said competition arbitration process for the information table of the lower priority service class, after repeating said candidate selection process and competition arbitration process by the predetermined times or after the logic queue issuing the connection request runs out on said information table of the higher priority service class.

After said candidate selection process is executed for the logic queues belonging to the higher priority service class and then the candidate selection process is repeated by certain times, or after no candidate can be selected from the logic queue of the higher priority service class, said candidate selection process is executed for the logic queues belonging to the lower priority service class.

In another embodiment of the present invention, the arbiter section (21) has the information table indicating which the logic queue can gain the connection right to which input buffer section, each input buffer section notifies said arbiter section of its possibility of gaining the connection right when more than certain number of cells are stored in each logic queue, said arbiter section receiving said notice sets the possibility of connection right in the corresponding part of said information table, executes the candidate selection process for each input port based on said rotation priority selection control, and determines the destination output port which makes the connection request at each input port, and repeats a series of processes to execute said competition arbitration process by several times to give said output port connection right to one of said input.

In the embodiment of the present invention, the information table is provided for each service class, said candidate selection process and competition arbitration process are executed sequentially from the information table of the higher priority service class, whereby the connection right to each output port is determined, said candidate selection process and competition arbitration process are executed for the information table of the lower priority service class, after said candidate selection process and competition arbitration process are repeated for said information table of the higher priority service class by the predetermined times, or after the logic queue which issues the connection request runs out on said information table of the higher priority service class.

Further, in the embodiment of the present invention, said candidate selection process and competition arbitration process are executed at every fixed time, and said output connection right once gained will be held until said candidate selection process and competition arbitration process are executed next time.

In accordance with the embodiment of the present invention, with the above-mentioned configuration, when every input port has the connection right to respective output port, and has the cell to be transferred to every destination output port, all the destinations selected in the next candidate selection process will be different, preventing occurrence of blocking.

By making it possible to select two or more destinations in the candidate selection process, a blocking occurrence rate can be reduced.

Further by limiting the notice from the input buffer to in information about whether a cell is stored or not, and providing an information table in the arbiter (21) to indicate the logic queue in the input buffer storing cells, and executing the candidate selection process by the main arbiter section, the communication capacity between the input buffer and the arbiter can be reduced.

The above-mentioned embodiment of the present invention will be described below in detail with reference to the attached drawings.

FIG. 1 is a block diagram showing the configuration of an embodiment of the present invention. Referring to FIG. 1, the ATM switching system according to the embodiment of the present invention consists of a plurality of input buffer sections 10-1 to 10-n (the input buffer sections 10-3 to 10-n are not shown) and a crossbar type switch section 20. Each of the input buffer sections 10-1 to 10-n includes logic queues 11-1 to 11-n, a cell information detector section 12, a connection information storage memory 13, a sub-arbiter section 14 and a cell transmitter section 15.

The crossbar type switch section 20 includes the main arbiter section 21 and a switch exchange section 22.

Each of the input buffer sections 10-1 to 10-n contains logic queues 11-1 to 11-n corresponding to the output ports 101-1 to 101-n, and stores the cells arrived at the input ports 100-1 to 100-n for respective destination output ports 101-1 to 101-n.

For the brief explanation, in this embodiment of the present invention, each of the logic queues 11-1 to 11-n is to store a cell for respective destination output ports 101-1 to 101-n, but the present invention can be applied without any modification even if each logic queue stores cells for each connection.

Further, in the input buffer sections 1-1 to 10-n, by preparing logic queues 11-1 to 11-n corresponding to each output port for each service class, multi-traffic class environment can be easily provided.

For the brief explanation, in this embodiment of the present invention, only one service class is assumed, but any desired number of service classes can be prepared.

The cell transmitter section 15 takes out a leading cell in a specific logic queue, and transmits it to the information signal transmission line 22-1 of the switch exchange 22.

Figure 2:
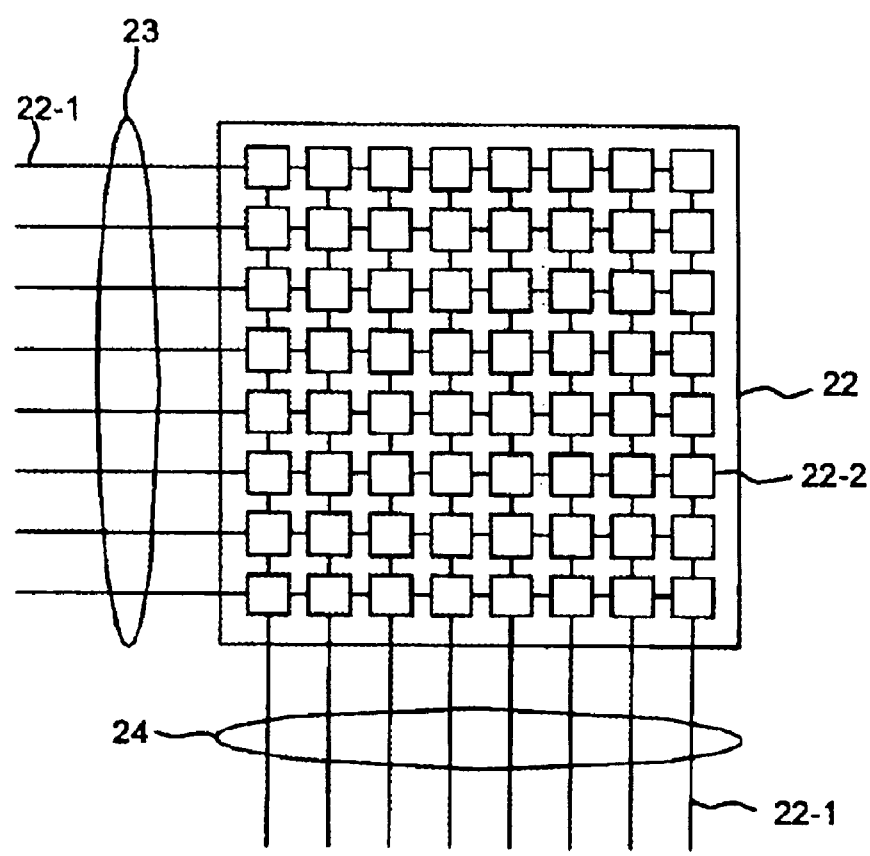
FIG. 2 is a block diagram showing the configuration of the crossbar type switch section of the embodiment of the present invention.

FIG. 2 illustrates an example of the configuration of the switch exchange 22 of the crossbar type switch section 20 in the embodiment of the present invention. Referring to FIG. 2, the switch exchange 22 of the crossbar type switch section 20 is constructed so that the cross point 22-2 of the information signal transmission line 22-1 set up like a grid is turned on/off, and when the cross point 22-2 is turned on, a cell is transferred between the input highway and the output highway which intersect at that cross point.

Figure 3:
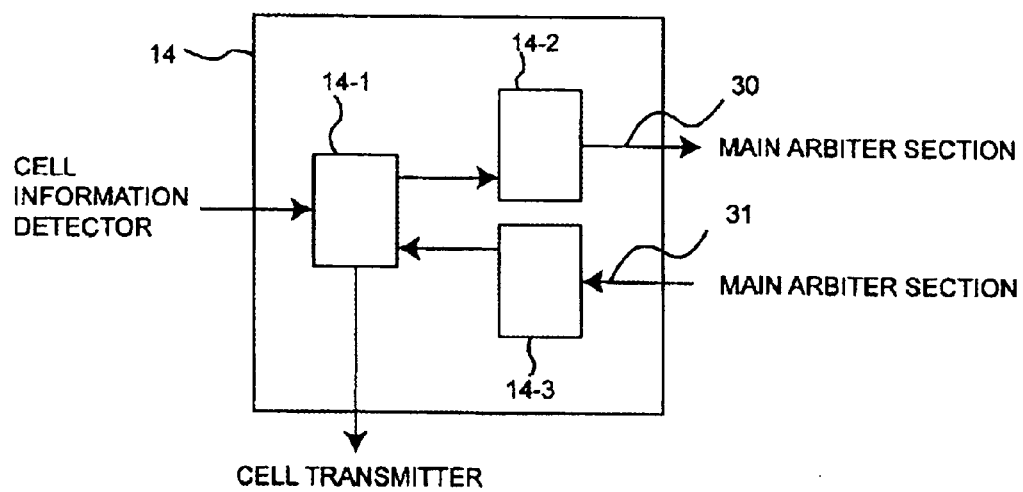
FIG. 3 is a block diagram showing the configuration of the sub-arbiter in the example of the present invention.

FIG. 3 is a block diagram showing an example of the configuration of the sub-arbiter 14 in the input buffer section in the embodiment of the present invention. Referring to FIG. 3, the sub-arbiter 14 consists of a logic queue selector 14-1, a connection request signal transmitter 14-2 and a competition arbitration signal receiver 14-3.

Figure 4:
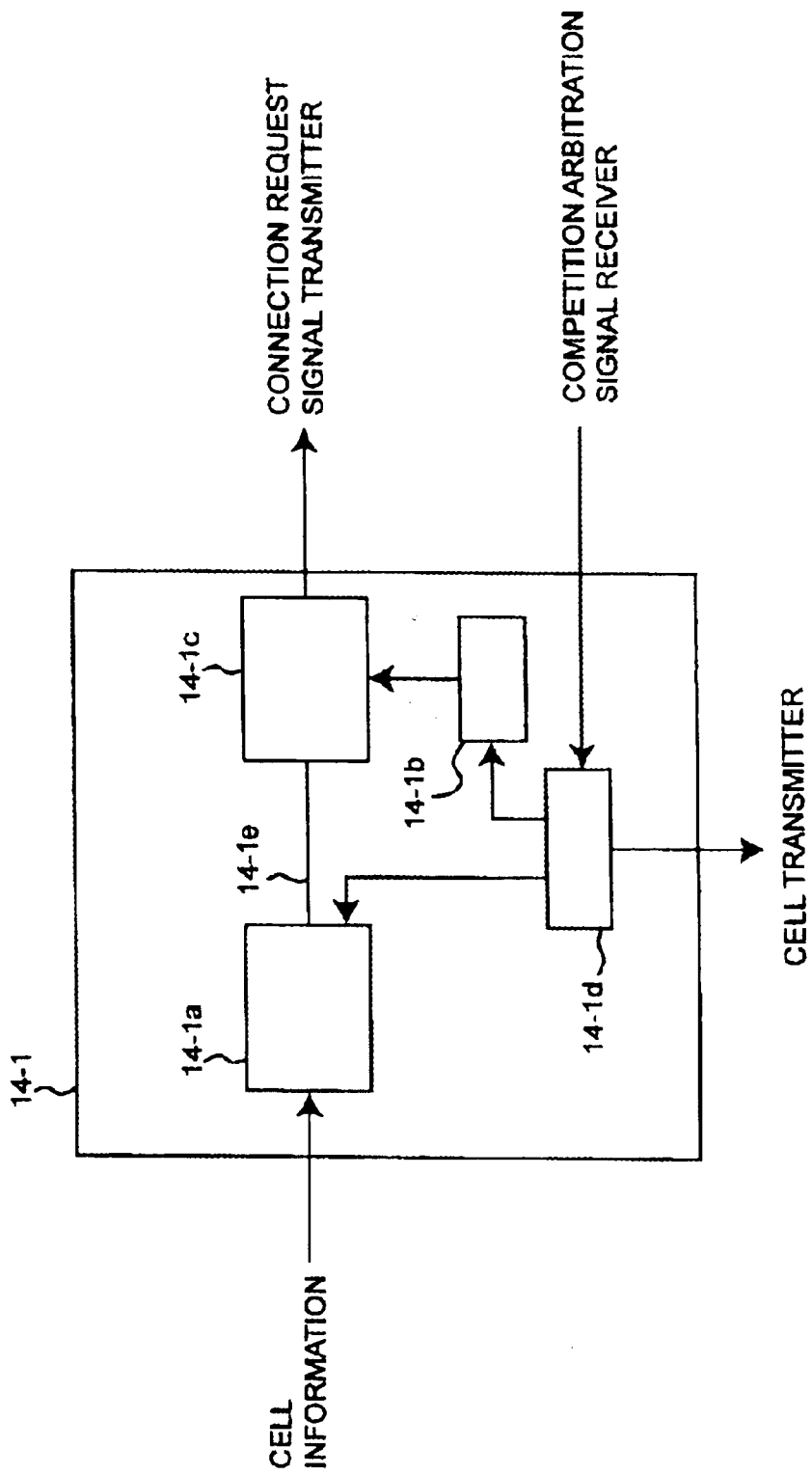
FIG. 4 is a block diagram showing the configuration of the logic queue selector in the embodiment of the present invention.

FIG. 4 is a block diagram showing an example of the configuration of the logic queue selector 14-1 of the sub-arbiter 14 in the embodiment of the present invention. Referring to FIG. 4, the logic queue selector 14-1 consists of a cell storage status control memory 14-1a which stores the cells to be transferred to respective destination output ports, a register 14-1b which saves the output port numbers which obtained the connection right last time for each service classe, a rotation priority selector 14-1c and a logic queue determiner 14-1d.

The rotation priority selector 14-1c searches a plurality of selection candidates according to the fixed order, and selects the candidate having the condition matched first. The logic queue determiner 14-1d sends the information about the logic queue to transfer a cell to the cell transmitter 15.

Figure 5:
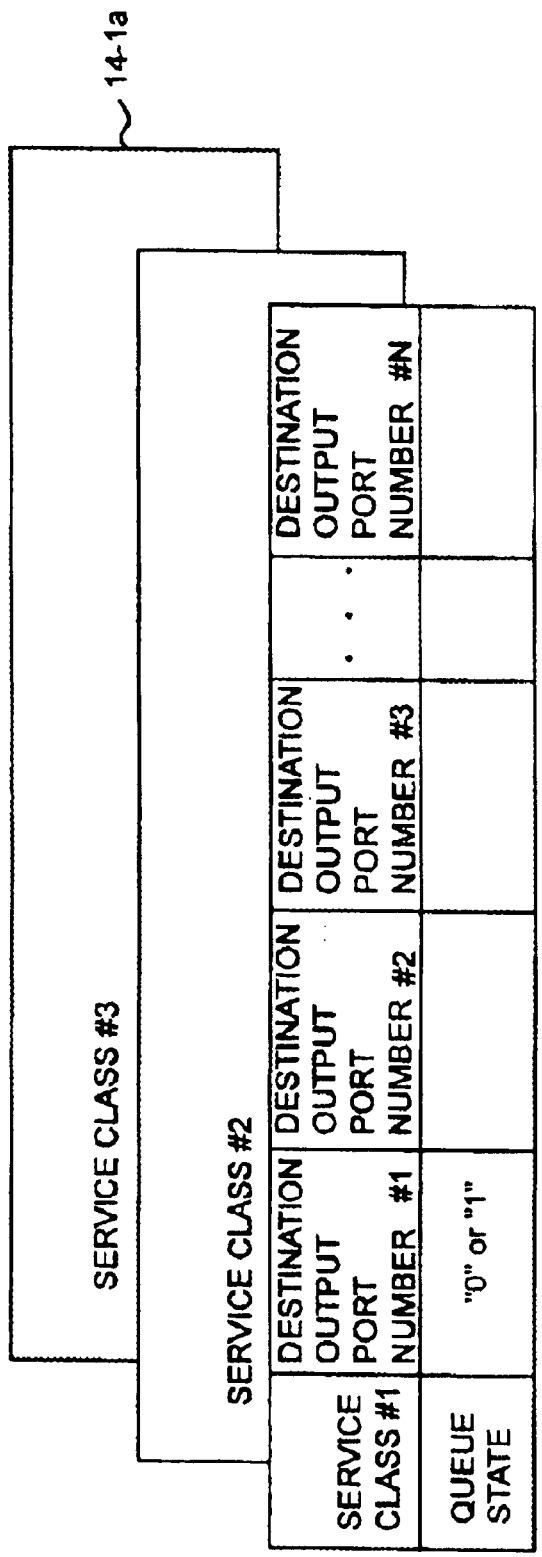
FIG. 5 is a block diagram showing an example of data storage in the cell storage status storage memory in the embodiment of the present invention.

FIG. 5 illustrates an example of information contents held by the cell storage status table to be stored in the cell storage status control memory 14-1a in the embodiment of the present invention. Referring to FIG. 5, the information for each destination output port to be recorded in the cell storage status table is any one of "0" indicating the port not to be selected or "1" indicating the port to be selected. "0" is recorded in the initial state. In the cell storage status table, the information about the destination output port is recorded for each service class.

Referring again FIG. 1, the cell information detector 12 in the input buffer section 19-1 to 10-n extrudes the connection identifier from the header of the cell arrived at the input port 100-1 to 100-n, refers to the connection information data base 13 using the connection identifier as a key, and identifies the service class and destination output port to which the cell belongs. Based on this identification result, the detector 12 stores a cell in appropriate logic queue 11-1 to 11-n.

When the number of cells stored in a logic queue reaches the predetermine number or more, "1" indicating the port to be selected is overwritten and registered in the corresponding logic queue column in the cell storage status table (see FIG. 5) to be stored in the cell storage status control memory table 14-1a.

The cell transmitter 15 takes out a leading cell from the specific logic queue notified from the logic queue determiner 14-1d in the logic queue selector section, and transmits it to the information signal transmission line 22-1 of the switch exchange 22. At this time, when the number of the cells stored in the logic queue from which the leading cell is taken out decreases to lower than a certain number, "0" indicating the port not to be selected is overwritten and registered in the corresponding logic queue column in the cell storage status table 14-1a.

Figure 6:
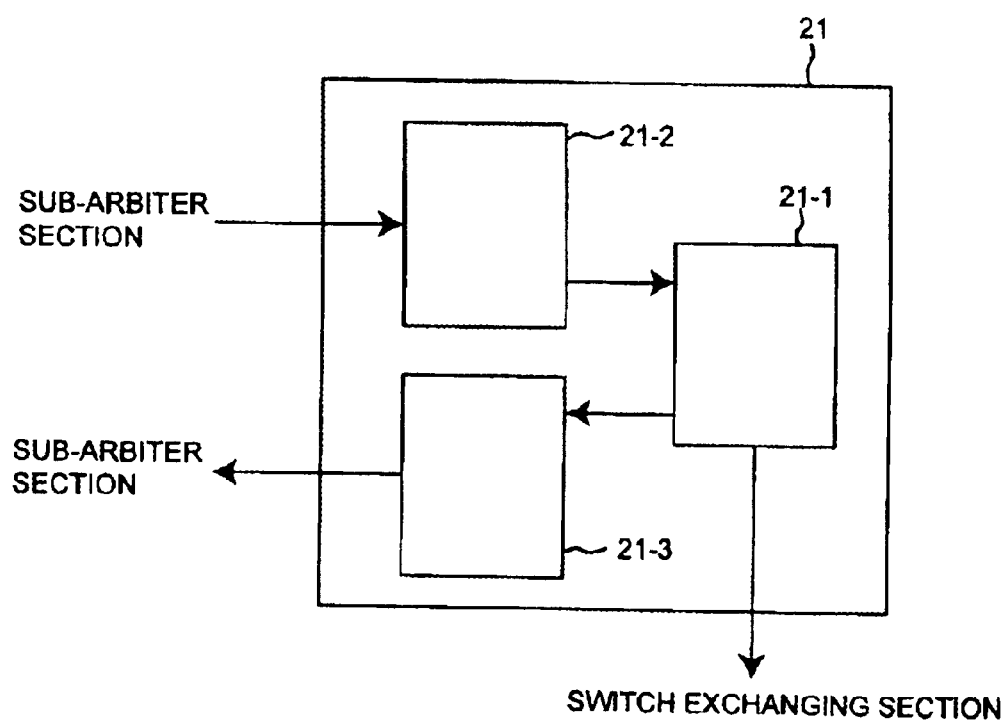
FIG. 6 is a block diagram showing the configuration of the main arbiter section in the embodiment of the present invention.

FIG. 6 is a block diagram showing an example of the configuration of the main arbiter 21 in the embodiment of the present invention. Referring to FIG. 6, the main arbiter 21 consists of a connection right determiner 21-1, a connection request signal receiver 21-1 and a competition arbitration signal transmitter 21-3.

Figure 7:
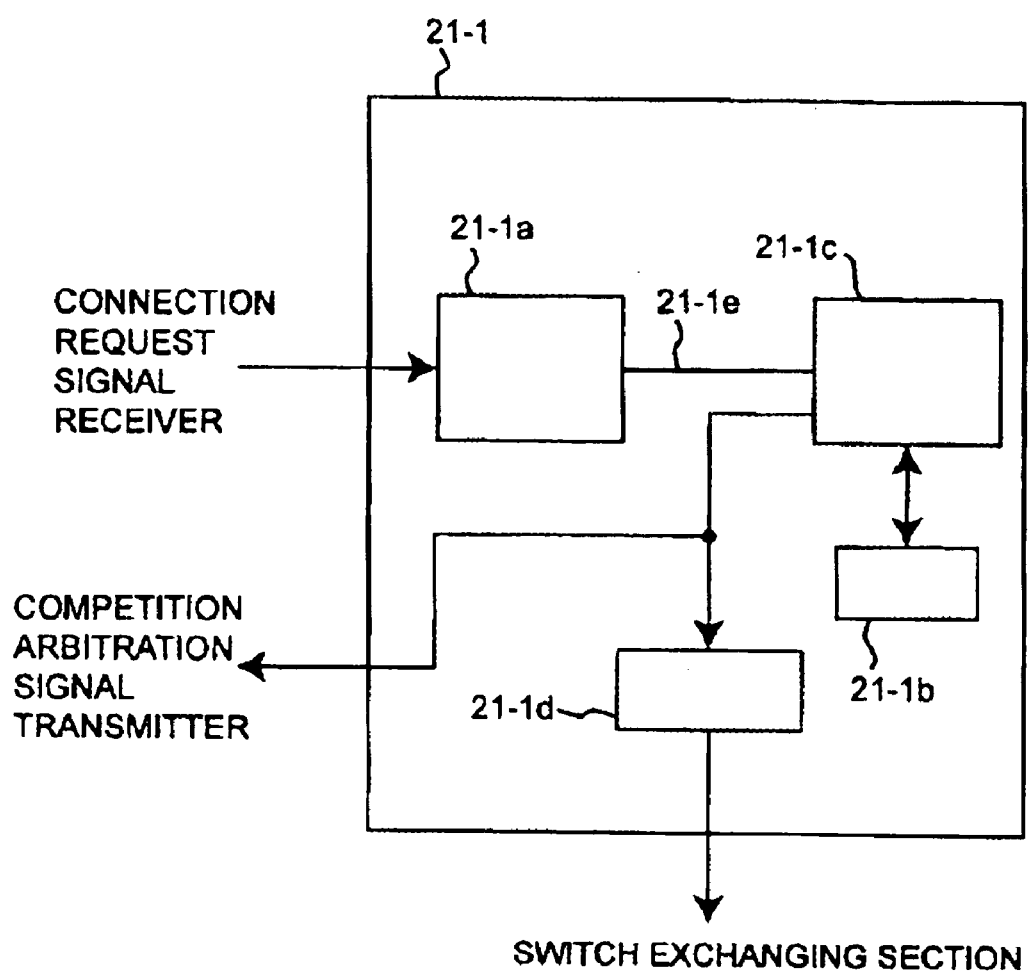
FIG. 7 is a block diagram showing the configuration of the connection right determiner in the embodiment of the present invention.

FIG. 7 is a block diagram showing an example of the configuration of the connection right determiner 21-1 in the main arbiter 21 of the embodiment of the present invention. The connection right determiner 21-1 in the main arbiter 21 consists of a connection request status control memory 21-1a storing the input ports issuing the connection request to respective output ports, a register 21-1b saving the input port numbers which gained the connection right for each output port and each service class last time, a rotation priority selector 21-1c and an input port determiner 21-1d.

The rotation priority selector 21-1c searches a plurality of candidates in the predetermined fixed order and selects the candidate that meets the condition first. The input port determiner 21-1d notifies the switch exchange 22 of the information about the input ports to be connected to specific output ports.

The switch exchange 22 turns on the respective cross point 22-2 to make connection between the specified input port and output port.

Figure 8:
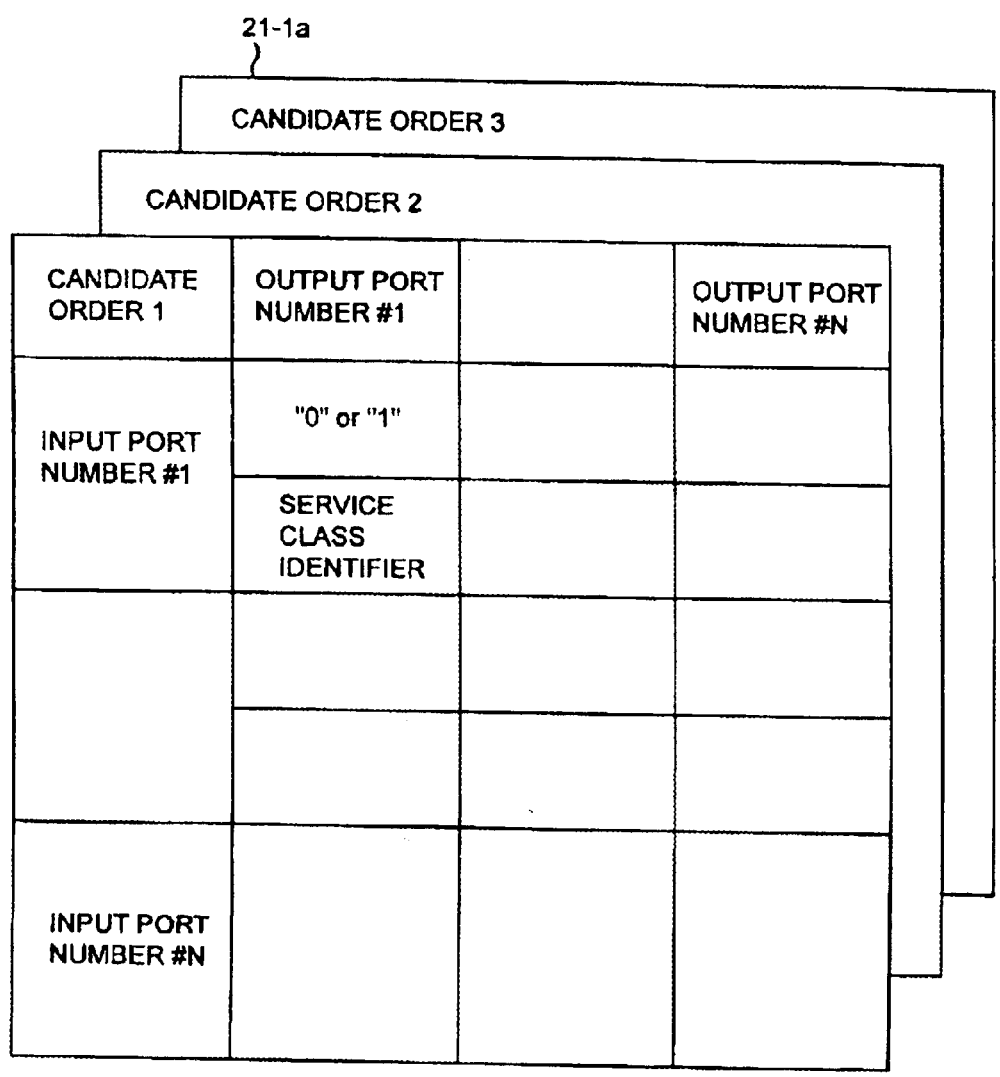
FIG. 8 is a block diagram showing an example of data storage in the connection request status storage memory in the embodiment of the present invention.
Figure 9:
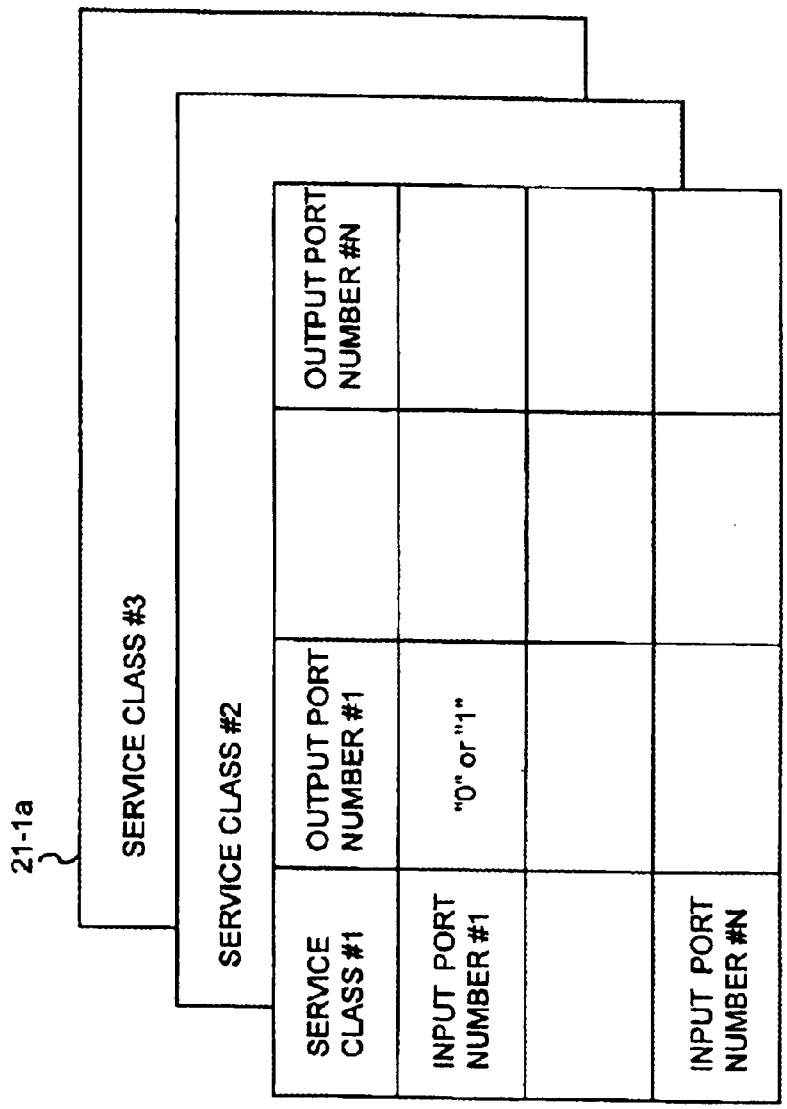
FIG. 9 is a block diagram showing an example of data storage in the connection request status storage memory in the embodiment of the present invention.

The FIG. 8 and FIG. 9 illustrate an example of the connection request status table to be stored in the connection request status control memory 21-1a. Either is prepared to indicate the input ports issuing the connection request to respectively output ports.

At the arbitration timing, when a plurality of connection request destinations are ordered and notified by each input port, use the form (FIG. 8) which prepares the table showing the input ports issuing the connection request to respective output ports and service classes for each candidate.

If the connection request destinations are notified without the order, use the form (FIG. 9) which prepares the table showing only the input ports issuing the connection requests to respective output ports for each service class, and fills out disregarding the candidate order.

Referring to FIG. 8, the information recorded in the upper half of each column of the connection request status table is no "0" indicating no connection request or "1" indicating a connection request, and initially "0". In the lower half, the service class identifier indicating which service class the connection request belongs to.

Referring to FIG. 9, the information recorded in each column of the connection request status table is "0" indicating no connection request or "1" indicating a connection request, and initially "0".

Referring again to FIG. 3, the connection request signal transmitter 14-2 of the sub-arbiter 14 in the input buffer section generates a connection request signal 30 conveying the information about the logic queue selected by the logic queue selector 14-1, and sends the signal to the main arbiter 21. The competition arbitration signal receiver 14-3 receives the competition arbitration signal 31 from the main arbiter 21, and sends the arbitration result from the main arbiter 21 to the logic queue determiner 14-1d in the logic queue selector 14-1.

Referring to FIG. 6, the connection request signal receiver 21-2 of the main arbiter 21 receives the connection request signal 30 from each input buffer section, and records the output ports requested by each input port in the connection request status table 21-1a.

The competition arbitration signal transmitter 21-3 of the main arbiter 21 generates a competition arbitration signal 31 and sends it to the sub-arbiter 11 of the input buffer section.

Figure 10:
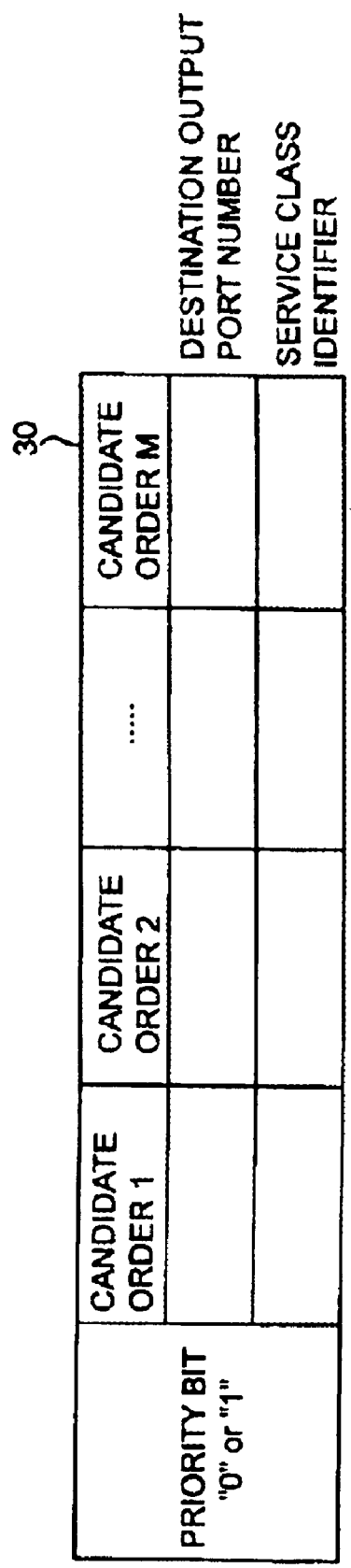
FIG. 10 is a diagram showing the format of the connection request signal in the embodiment of the present invention.

FIG. 10 illustrates an example of the format of the connection request signal 30 sent from the connection request signal transmitter 14-2 to the main arbiter 21 in the embodiment of the present invention. In this embodiment, the information to be transmitted consists of the destination output port number issuing the connection request and the service class identifier, and several sets of these contents can be transmitted. An order bit is prepared to indicate whether to give the order to the connection requests according to the order specified in the format. Set "1" in the order bit when giving the order to plural candidates, and set "0" when handing plural candidates flat without giving the order.

Figure 11:
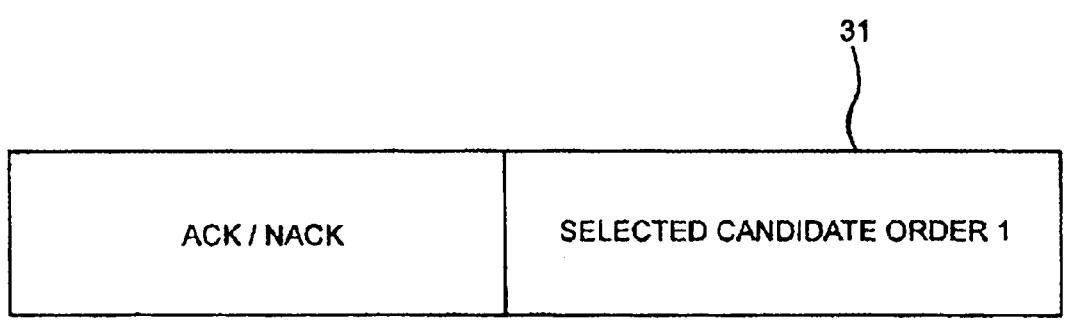
FIG. 11 is a diagram showing the format of the competition arbitration signal in the embodiment of the present invention.

FIG. 11 illustrates an example of the format of the competition arbitration signal 31 sent from the arbitration signal transmitter 21-3 to the sub-arbiter 14 in the embodiment of the present invention. In this embodiment, the format consists of the information (ACK/NACK) indicating whether the request from the input buffer is accepted, and the information (selected candidate order) indicating which request is accepted when two or more connection requests are notified by the connection request signal 30.

Figure 12:
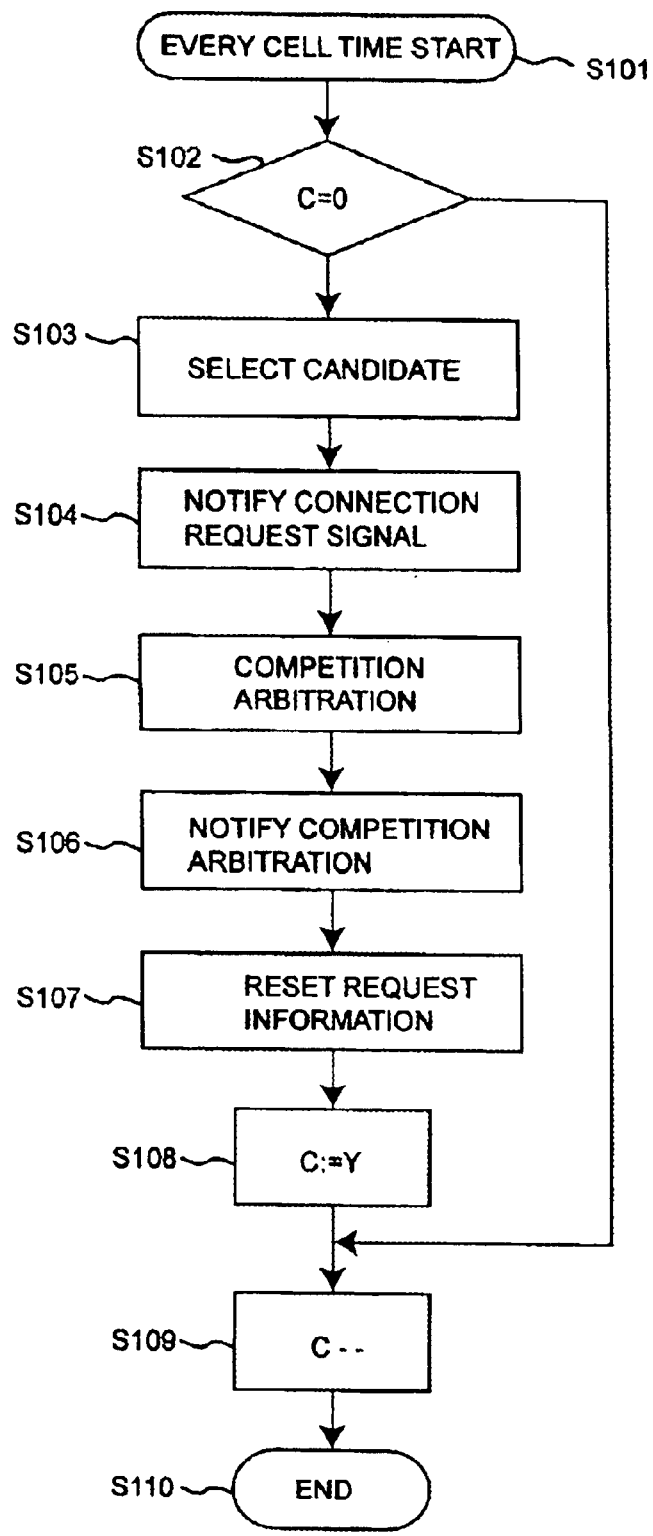
FIG. 12 is a flow chart showing the candidate selection and competition arbitration process in the embodiment of the present invention.

FIG. 12 is a flow chart showing the whole processing in the embodiment of the present invention. The operation of the embodiment of the present invention is described below with reference to FIG. 12.

A variable C (a timer count) is prepared so that the candidate selection and competition arbitration are executed at every fixed time. The variable C will decrement at every cell time (step S108), and as long as the variable C is zero, the candidate selection and competition arbitration will be executed (step S102).

After both candidate selection and competition arbitration are executed, a wait time Y for the next execution is put in the variable C (step S107).

In the candidate selection (step S103), before the logic queue selector 14-1 of the input buffer section selects a logic queue, referring to FIG. 4, first the output port number saved in the previous connection right gain output port number register 14-1b is applied to the rotation priority selector 14-1c. This output port number uniquely determines the output port to which the connection right is given last time.

Then, the cell storage status table 14-1a is referred to, and for the logic queue to be selected, the corresponding input signal line 14-1e of the rotation priority selector 14-1c is turned on.

The rotation priority selector 14-1c searches the input signal line 14-1e in certain fixed order, starting from the output port number next to the port number obtained from the previous connection right gained output port number saving register 14-1b, and selects the logic queue corresponding to the turned-on input signal line 14-1e detected first after the start of searching.

The above-mentioned process is repeated by the predetermined times to select a plurality of logic queues. In the process of the rotation priority selector 14-1c after the 2nd time, the start point of the rotation priority control is set to the logic queue placed next to the queue selected in the preceding process.

Referring to FIG. 3, when notifying the main arbiter 21 of the destination output port of the logic queue selected by the logic queue selector 14-1, the connection request signal transmitter 14-2 of the sub-arbiter 14 in the input buffer section chooses one of the ways, assigning the order to the candidates and not assigning the order. The order bit is used to discriminate the former way from the latter.

Figure 13:
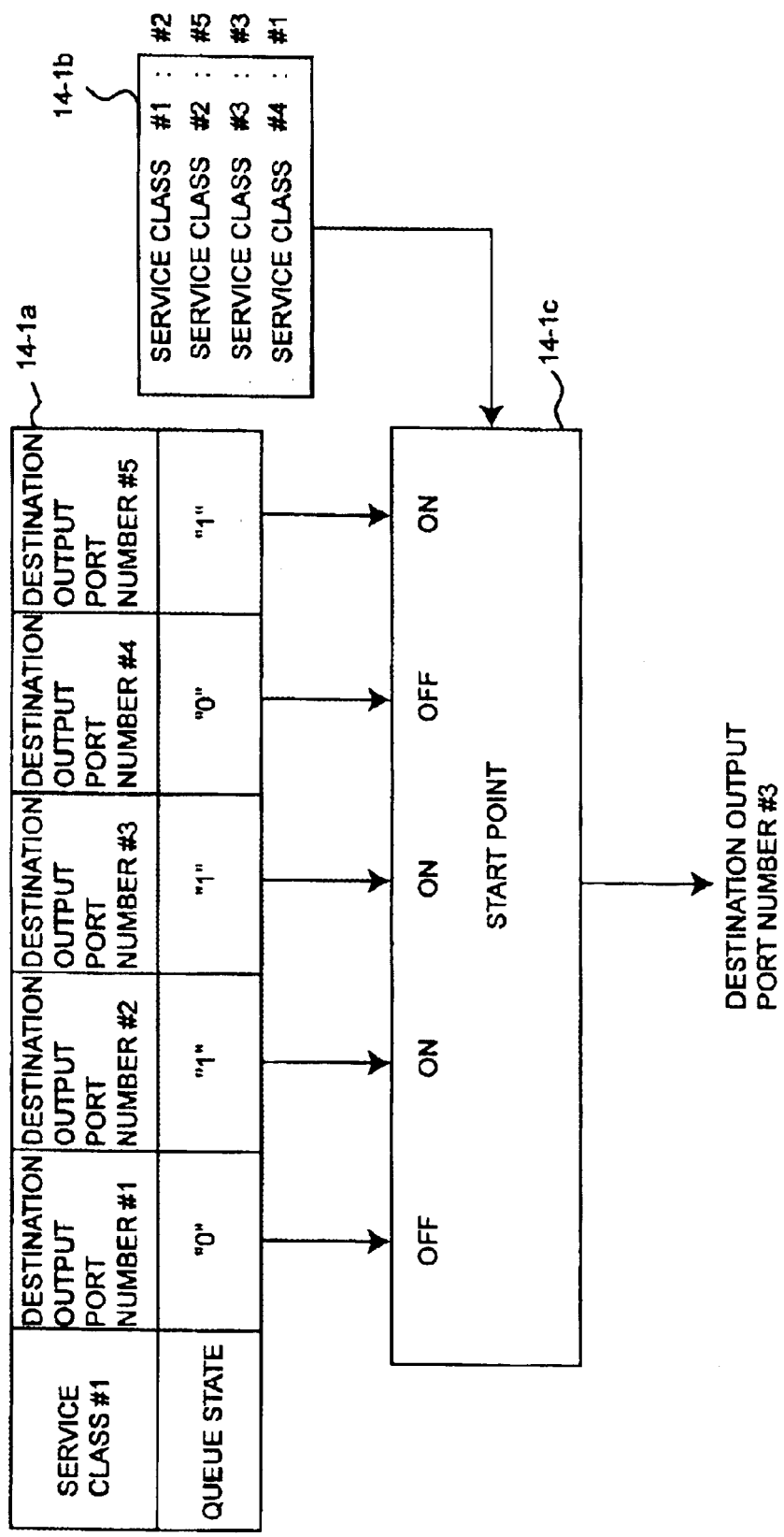
FIG. 13 is a state diagram explaining the candidate selection process in the embodiment of the present invention.
Figure 14:
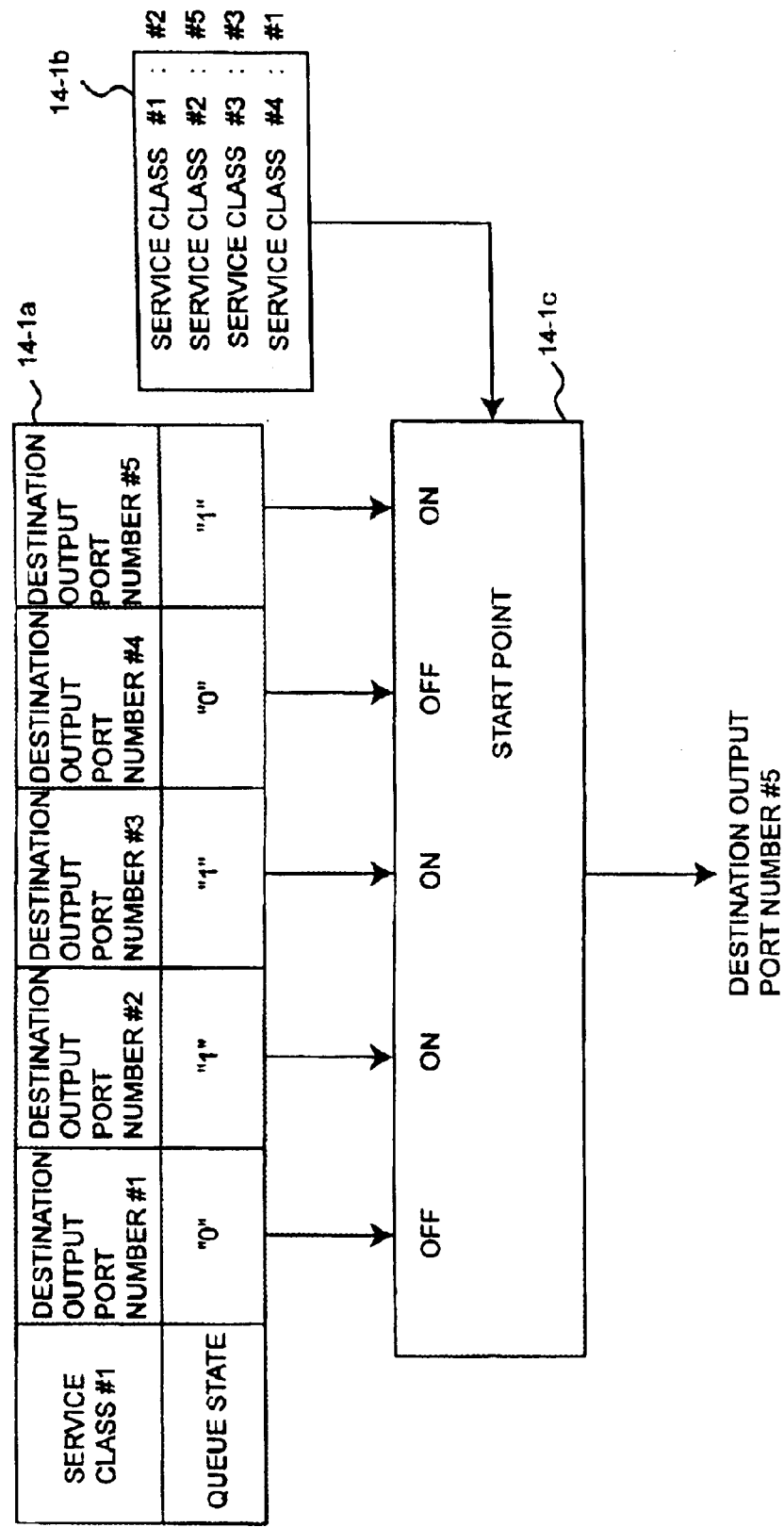
FIG. 14 is a state diagram explaining the candidate selection process in the embodiment of the present invention.

FIG. 13 and FIG. 14 illustrate an example of the candidate selection executed by the logic queue selector 14-1. For the brief explanation, description is given below as to the case where the candidate selection is executed for the service class #1.

The rotation priority selector 14-1c of the logic queue selector 14-1 is to search the destination output ports in the order of #1, #2, #3, #4, #5, #1, #2, . . . The priority will be lowered in the ascending order.

By referring to the cell storage status table 14-1a, for the service class #1, the logic queues issuing the connection request to the output ports #2, #3 and #5, and turn on the corresponding input signal lines of the rotary priority selector 14-1c.

As the output port number assigned to the service class #1 saved in the previous connection right gained output port number register 14-1b is #2, the rotation priority selector 14-1c sets the destination output port #3 as a start point of rotary priority control.

Searching the destination output ports in the order of #3, #4, #5, #1 and #2, the turned-on input signal line searched first is of the port #3, and the rotation priority selector 14-1c selects the port #3 as a connection request destination (FIG. 13).

When selecting one more destination, repeat the above process starting from the port #4.

As a result, the rotation priority selector 14-1c selects the destination output #5 as the second connection request destination (FIG. 14).

Referring again to FIG. 12, in the competition arbitration process (step S105), when each input buffer section gives the candidate order to the logic queues according to the selected order and sends the connection request signal 30, and when the connection right determiner 21-1 of the main arbiter 21 determines the connection right, it first translates the contents of the connection request signal 30 from each input buffer section, and records the connection request in the connection request status table 21-1a prepared for each ordered candidate.

Then, referring to FIG. 7, in the connection right determiner 21-1 of the main arbiter 21, the input port numbers saved for each output port and each service class in the previous connection right given input port number saving resister 21-1b are sent to the rotation priority selector 21-1c. The input port number uniquely identifies the input port which gained the connection right to the respective output port last time.

The connection request status table 21-1a with the higher candidate order is referred first, and corresponding input signal line 21-1e of the rotary priority selector 21-1c is turned on for the input port which requests connection to a certain output port. If two or more connection requests with different priority compete for the same output port, then the input signal line 21-1e is turned on taking account of the connection request belonging to the highest priority service class.

The rotation priority selector 21-1c searches the input signal line 21-1e in certain fixed order starting from the input port number next to the output port obtained from the previous connection right given input port number saving register 21-1b and the input port number for the service class of that output port, and selects the input port corresponding to the turned-on input signal line 21-1e searched first.

The above competition arbitration is executed for all output ports, and the connection right is determined. If any output port is given no connection right, the connection request status table 21-1a with the lower candidate order is referred, and similar competition arbitration is executed.

After the competition arbitration is executed for all candidates in the connection request status table 21-1a or when all input ports are given the connection right to their destination outputs, the competition arbitration signal transmitter 21-3 sends the sub-arbiter 14 of each input buffer section the competition arbitration signal 31 stating whether it gained the connection right and to which output port the connection right is given. (Step S106 in FIG. 12)

The input port numbers given the connection right at each output port is then overwritten in the corresponding service class column in the previous connection right given input port number saving register 21-1b.

All contents of the candidate ordered in the connection request status table 21-1a are reset. (Step S107 in FIG. 12)

Figure 15:
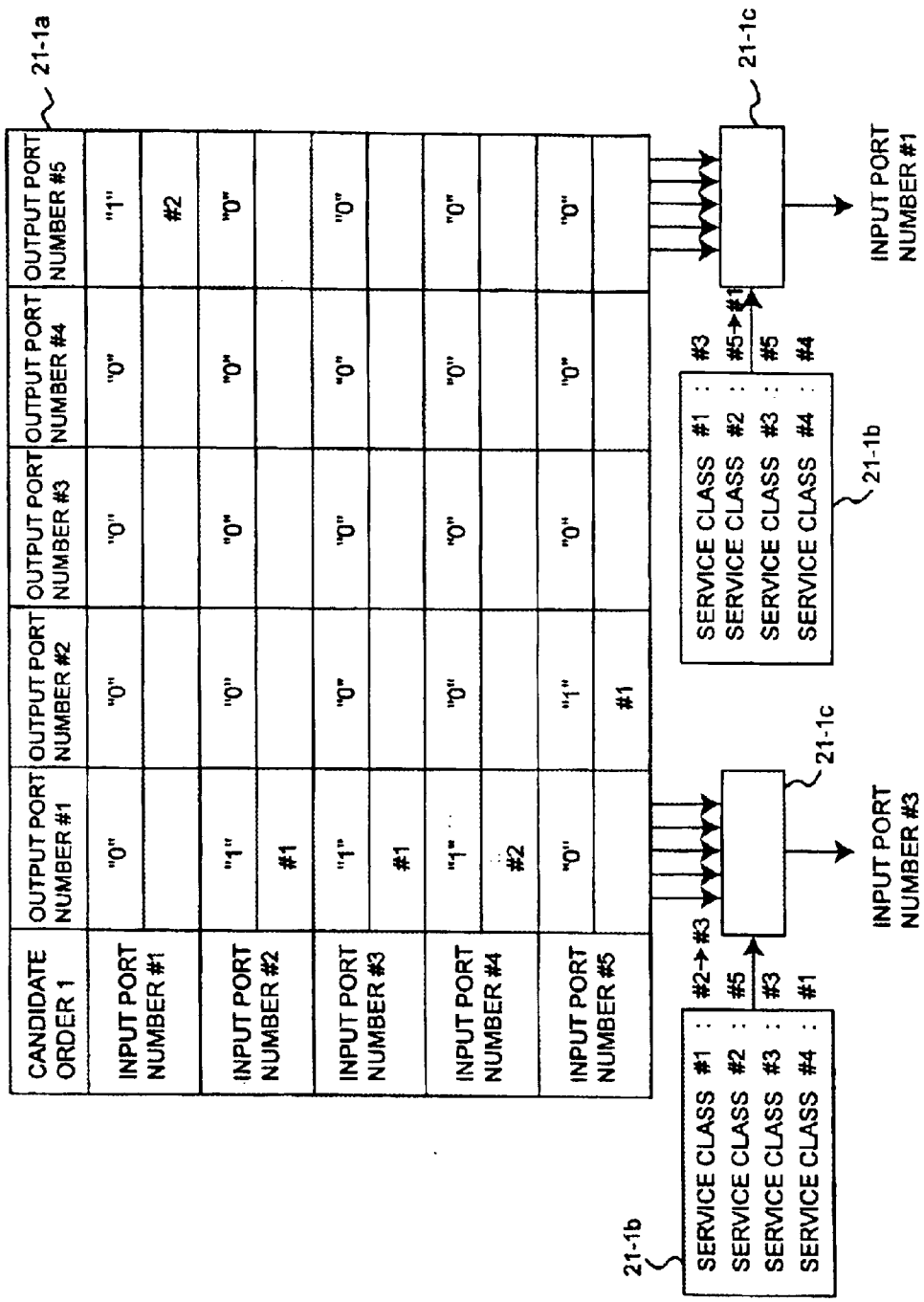
FIG. 15 is a state diagram explaining the competition arbitration process in the embodiment of the present invention.

FIG. 15 illustrates an example of competition arbitration executed by the connection right determiner 21-1 of the main arbiter 21 (FIG. 7) in the embodiment of the present invention. For the brief explanation, the competition arbitration for the candidate order 1 will be explained.

The rotation priority selector 21-1c is to search the input ports in the order of #1, #2, #3, #4, #5, #1, #2, . . . The priority will be lowered in the ascending order.

Referring to the connection request status table 21-1a, the service class #1 of the input port #2, the service class #1 of the input port #3 and the service class #2 of the input port #4 issue the connection request to the output port #1.

In this case, the connection requests with different service classes compete for the same destination, and turn on the corresponding input signal line of the rotation priority selector 14-1c taking account of the connection request with the highest priority, that is, the service class #1.

As the input port number assigned to the service class #1 saved in the previous connection right given input port number register 21-1b is #2, the rotation priority selector 21-1c sets the input port #3 as a start point of rotary priority control.

Searching the input ports in the order of #3, #4, #5, #1 and #2, the turned-on input signal line searched first is of the port #3, and the rotation priority selector 21-1c selects the input port #3 for the connection right destination.

Then, change the service class #1 column of the previous connection right given input port number saving register 21-1b to #3.

For the output port #5, only the input port #1 requests connection, and the input port #1 is given the connection right as a result of similar processing. Change the service class #2 column of the previous connection right given input port number saving register 21-1b to #1.

In the competition arbitration (step S105), when each input buffer section does not assign the candidate order to the logic queues in the selected order and sends the connection request signal 30, and when the connection right determiner 21-1 determines the connection right, it first translates the contents of the connection request signal 30 from each input buffer section, and records the connection request in the connection request status table 21-1a prepared for each service class.

The input port numbers saved for each output port and each service class in the previous connection right given input port number saving resister 21-1b are sent to the rotation priority selector 21-1c.

The input port number uniquely identifies the input port which got the connection right to the respective output port last time.

The connection request status table 21-1a with the higher candidate order is referred first, and corresponding input signal line of the rotary priority selector 21-1c is turned on for the input buffer which requests connection to a certain output port.

The rotation priority selector 21-1c searches the input signal line 21-1e in certain fixed order starting from the input port number next to the output port obtained from the previous connection right given input port number saving register 21-1b and the input port number for the service class of that output port, and selects the input port corresponding to the turned-on input signal line 21-1e searched first.

The above competition arbitration is executed for all output ports, and the connection right is determined. If there is an output port which gains no connection right, the connection request status table 21-1a of the lower priority service class is referred, and similar competition arbitration is executed.

After the competition arbitration is executed for all service classes in the connection request status table 21-1a or when all input ports are given the connection right to their destination outputs, the competition arbitration signal transmitter 21-3 sends the sub-arbiter 14 of each input buffer section the competition arbitration signal 31 stating whether it gained the connection and to which output port the connection right is given. (Step S106 in FIG. 12)

The input port numbers which gives the connection right to respective output port is then overwritten in the corresponding service class column in the previous connection right given input port number saving register 21-1b.

All contents of the service class in the connection request status table 21-1a are reset. (Step S107 in FIG. 12)

Figure 16:
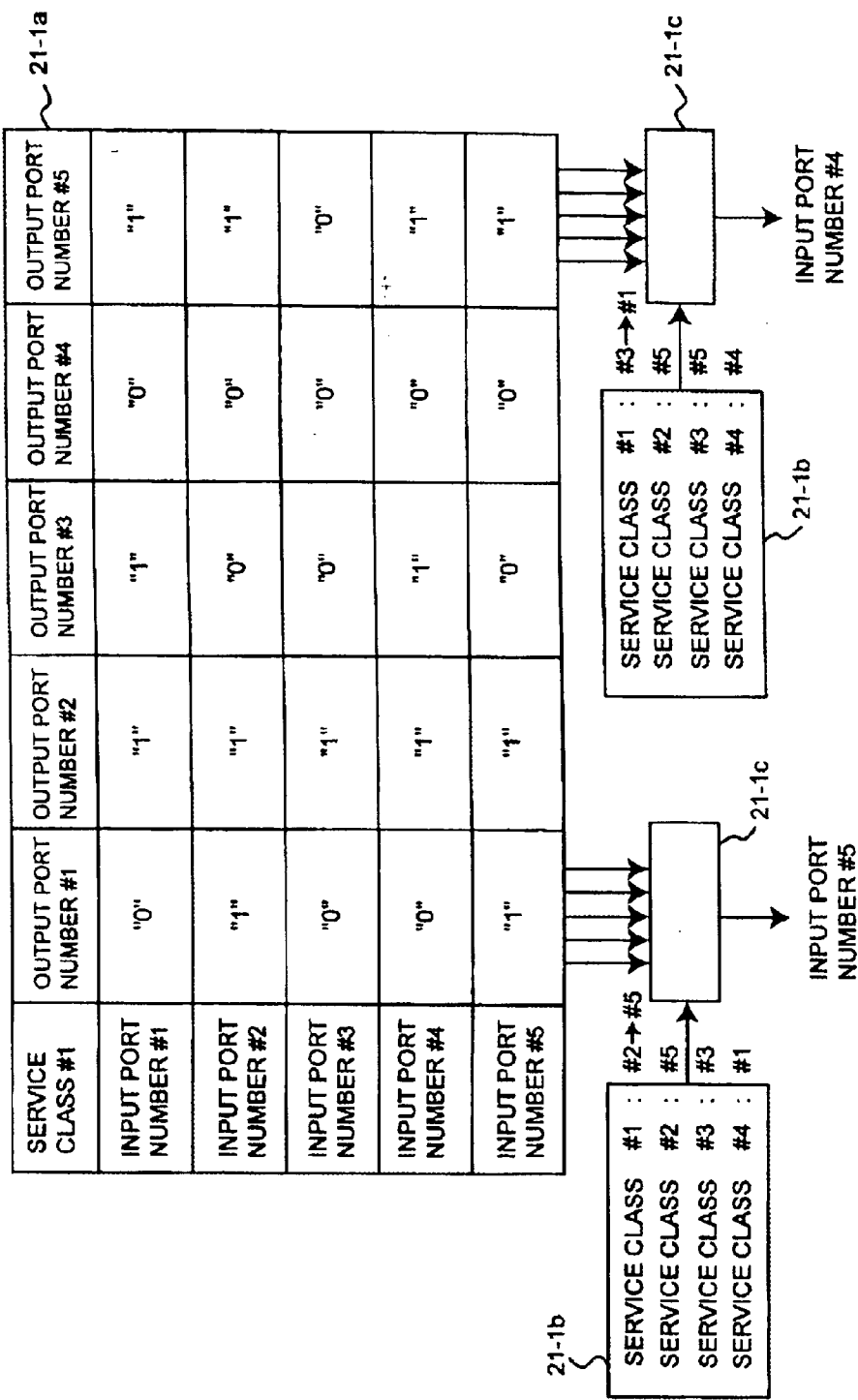
FIG. 16 is a state diagram explaining the competition arbitration process in the embodiment of the present invention.

FIG. 16 illustrates an example of competition arbitration executed by the connection right determiner 21-1 of the main arbiter 21 in the embodiment of the present invention. For the brief explanation, the competition arbitration for the service class #1 will be explained. The rotation priority selector 21-1c is to search the input ports in the order of #1, #2, #3, #4, #5, #1, #2, . . . The priority will be lowered in the ascending service class order.

Referring to the connection request status table 21-1*a*, the input ports #2 and #5 issue the connection request belonging to the service class #1, and turn on the corresponding input signal line of the rotation priority selector 14-1*c*.

As the input port number assigned to the service class #1 saved in the previous connection right given input port number register 21-1*b* is #2, the rotation priority selector 21-1*c* sets the input port #3 as a start point of rotary priority control.

Searching the input ports in the order of #3, #4, #5, #1 and #2, the first searched turned-on input signal line is of the destination output port number #5, and the rotation priority selector 21-1*c* selects the input port #5 for the connection right destination.

Then, change the service class #1 column of the previous connection right given input port number saving register 21-1*b* to #5.

Likewise, competition occurs for the output port #5, and the input port #4 is given the connection right as a result of similar processing. Change the service class #1 column of the previous connection right given input port number saving register 21-1*b* to #4.

Receiving the competition arbitration signal 31 stating that the connection right to a certain output port is gained, the logic queue determiner 14-1*d* of the logic queue selector 14-1 informs the cell transmitter 15 of the logic queue from which a cell is to be taken out, and records that output number in the corresponding service class column in the previous connection right gained output port number saving register 14-1*b*. If the competition arbitration signal 31 stating that the connection right to an output port is not gained, the logic queue determiner performs nothing and executes the rotation priority control from the same start point as that for the previous candidate selection in the next candidate selection.

Figure 17:
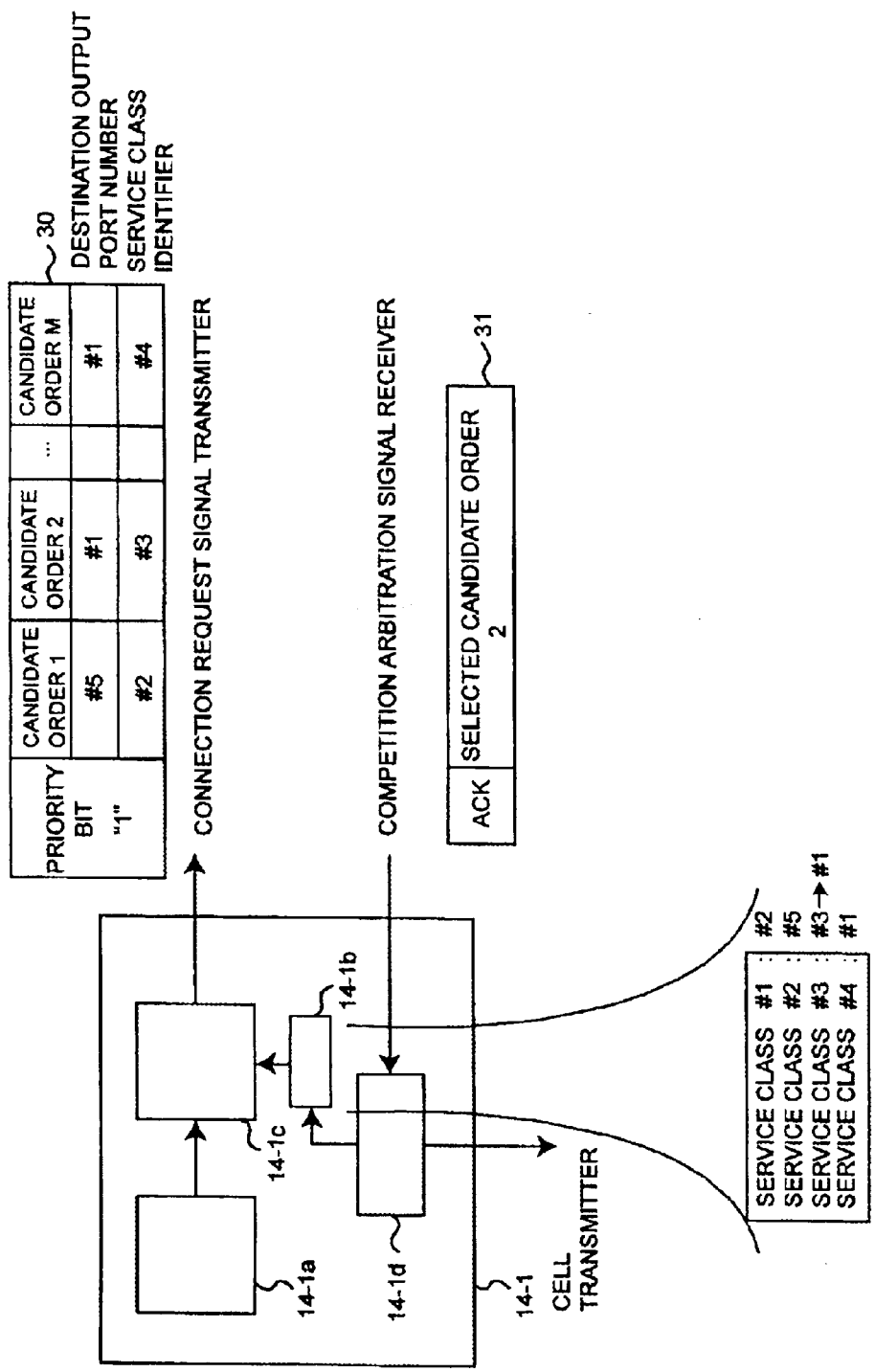
FIG. 17 is a state diagram explaining the process when the competition arbitration signal is received in the embodiment of the present invention.

FIG. 17 illustrates an example of the process that the competition arbitration signal receiver 14-3 (FIG. 3) of the sub-arbiter 14 of the input buffer section receives the competition arbitration signal 31 stating that the connection right to an output is gained.

The destination output selected by the candidate selection by the logic queue determiner 14-1*d* of the logic queue selector 14-1 is as stated in the connection request signal 30. The competition arbitration signal 31 received from the main arbiter 21 states that the connection request corresponding to the entry of the candidate order 2 is accepted.

The logic queue determiner 14-1*d* of the logic queue selector 14-1 notifies the cell transmitter to transmit the leading cell in the logic queue to be sent to the output port #1 belonging to the service class #3, and changes the service class #3 column in the previous connection right gain output port number saving register 14-1*b* to #1.

By executing the above explained process, if the ATM switching system in accordance with the embodiment of the present invention ensures the connection right to a certain output port, and if it holds the cells to be sent to all output ports, all the destinations to be selected by each input buffer in the next candidate selection will be different, and no blocking will occur.

The blocking occurrence rate can be further decreased by making it possible to select a plurality of destinations in the candidate selection process.

Figure 18:
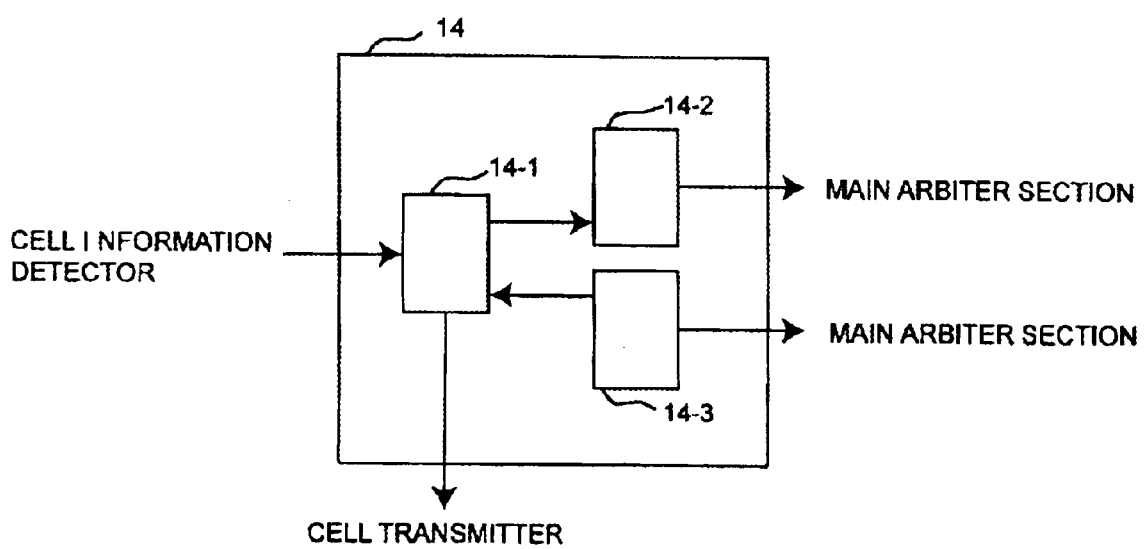
FIG. 18 is a block diagram showing the configuration of the sub-arbiter in the second embodiment of the present invention.
Figure 19:
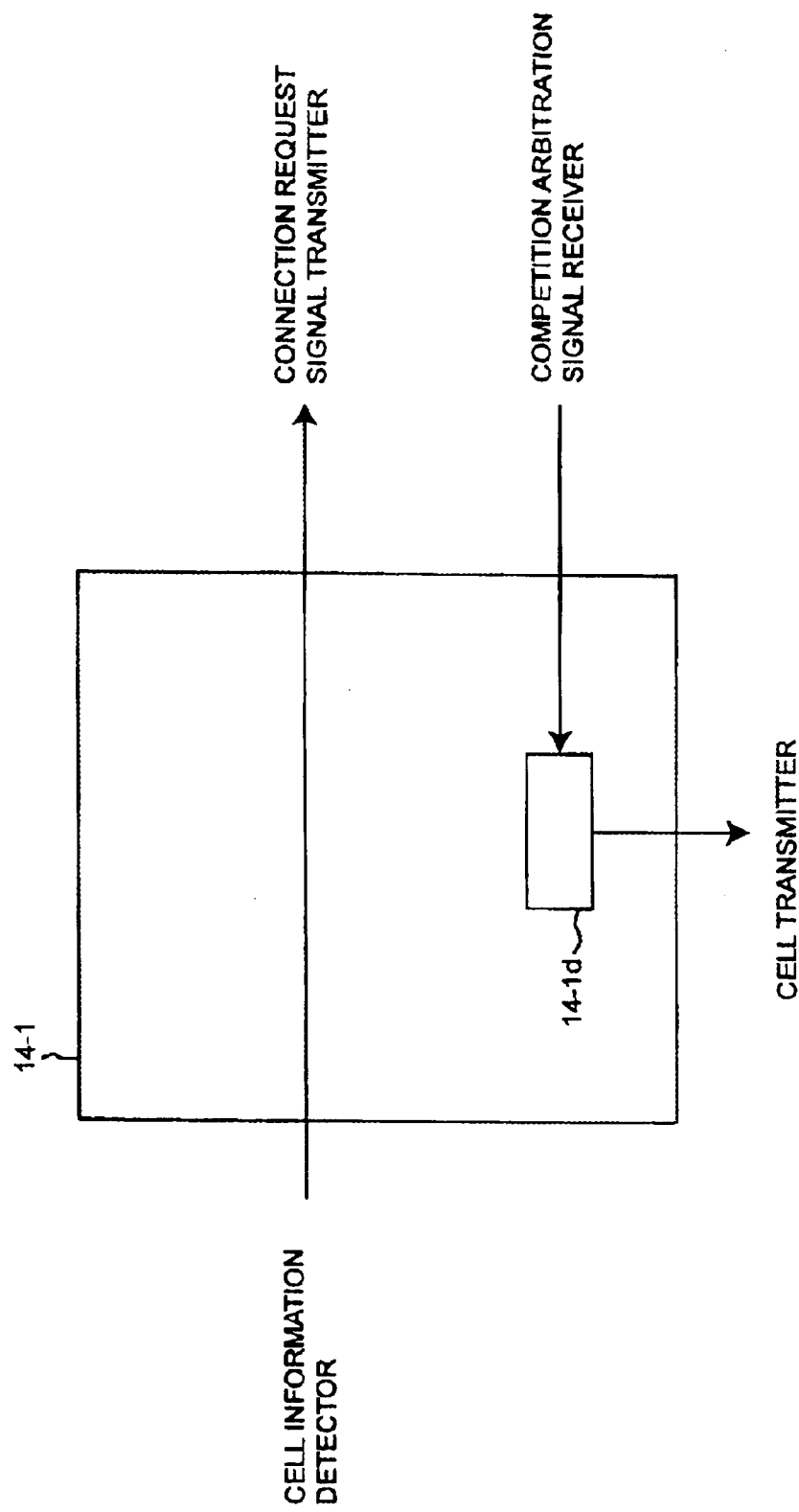
FIG. 19 is a block diagram showing the configuration of the logic queue selector in the second embodiment of the present invention.
Figure 20:
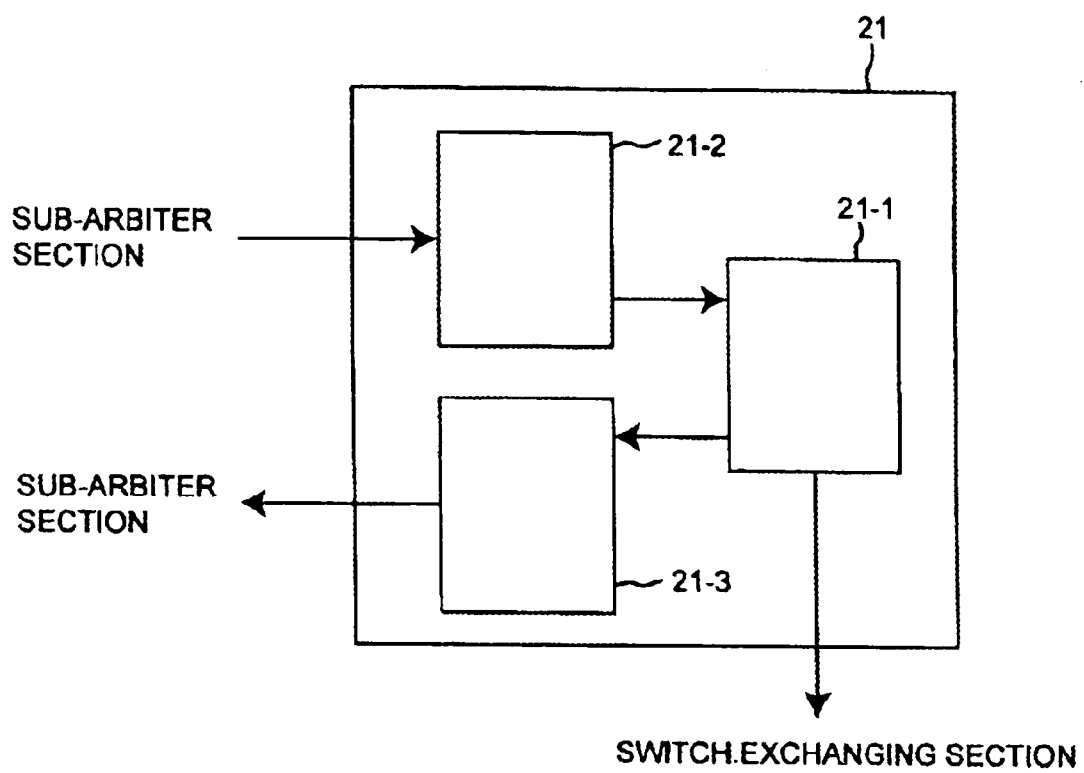
FIG. 20 is a block diagram showing the configuration of the main arbiter in the second embodiment of the present invention.
Figure 21:
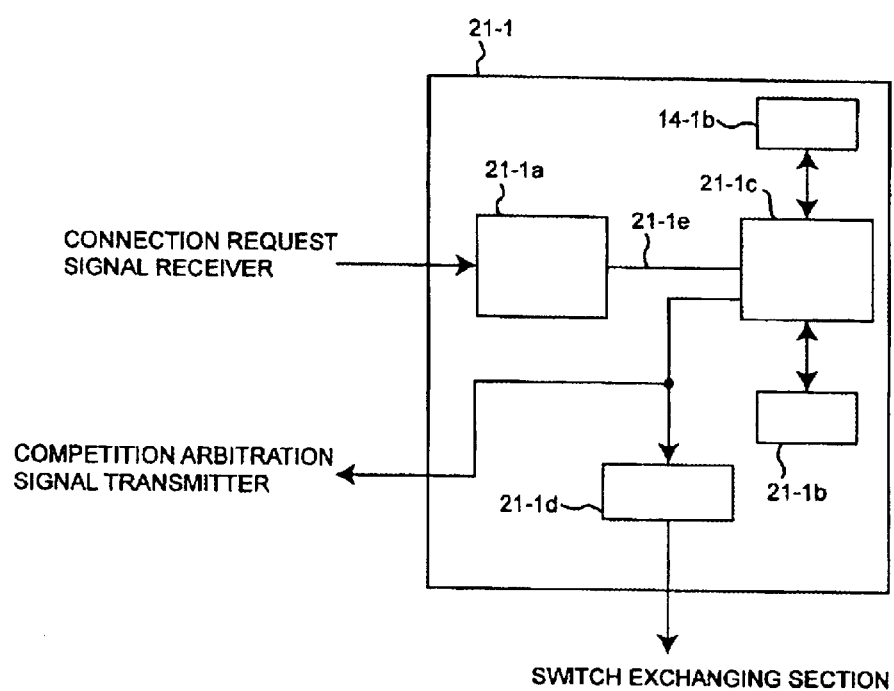
FIG. 21 is a block diagram showing the configuration of the connection right determiner in the second embodiment of the present invention.
Figure 22:
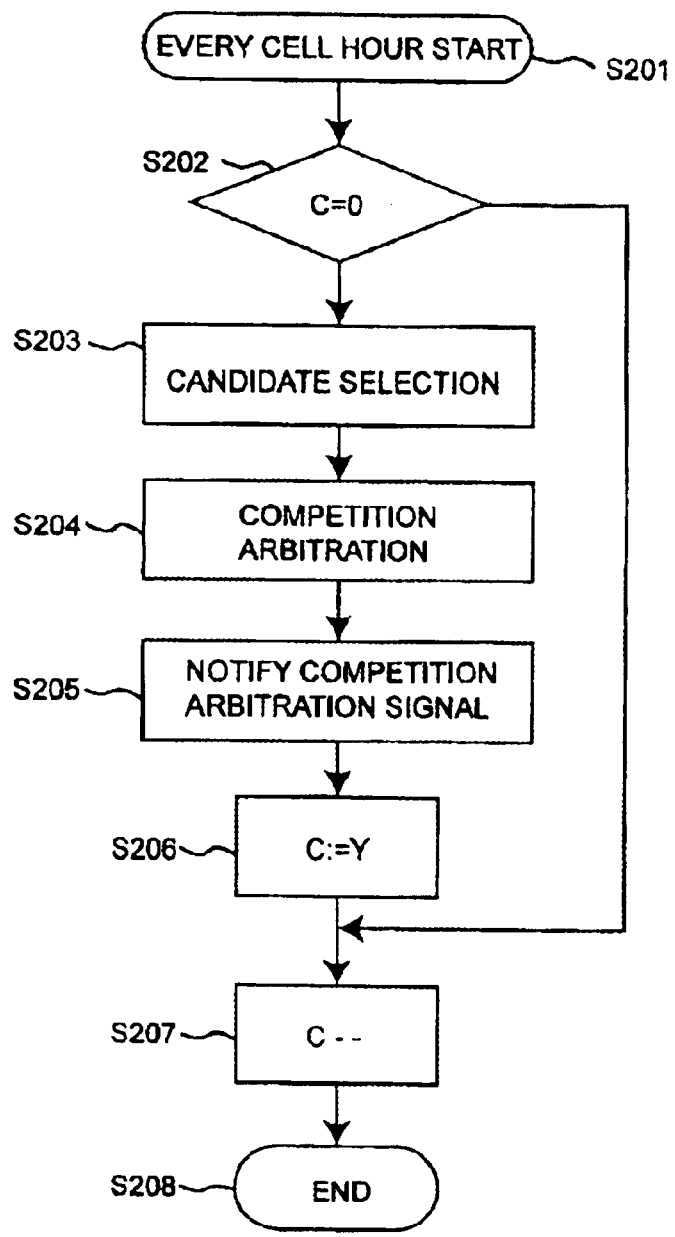
FIG. 22 is a flow chart showing the candidate selection and competition arbitration process in the second embodiment of the present invention.

The second embodiment of the present invention will be explained below. FIG. 22 is a flow chart showing the flow of whole processing in this embodiment. In the second embodiment, the logic queue selector 14-1 in the sub-arbiter 14 and the connection right determiner 21-1 in the main arbiter 21, both explained with the first embodiment, are changed as shown in FIG. 18 to FIG. 21. FIG. 18 shows an example of the configuration of the sub-arbiter 14. FIG. 19 shows an example of the configuration of the logic queue selector 14-1. FIG. 20 shows an example of the configuration of the main arbiter 21. FIG. 21 shows an example of the configuration of the connection right determiner 21-1.

In the second embodiment of the present invention, when the number of cells stored in the logic queue exceeds a fixed number, the cell information detector informs it directly to the connection request signal transmitter 14-2 in the sub-arbiter 14. The connection request signal transmitter 14-2 sends the connection request signal 30 to the main arbiter 21 to inform that specific logic queue is ready to get the connection right.

Referring to FIG. 20 and FIG. 21, the connection request signal receiver 21-2 in the main arbiter 21 receives the connection request signal 30 from each input buffer section, and records the input port which is ready to get the connection right to respective output port and service class in the connection request status table 21-1*a* prepared for each service class. This process itself is the same as the process to translate the connection request signal 30 and write the contents in the connection request status table 21-1*a*, as explained with the first embodiment.

In the second embodiment of the present invention, the main arbiter 21 executes candidate selection and competition arbitration by using only the connection request status table 21-1*a*. (Step S203, S204 in FIG. 22) The main arbiter refers to the connection request status table 21-1*a* of the higher priority service class, and selects the logic queue to be served for each input port.

The output port numbers for each service class saved in the previous connection right gained output port number saving register 14-1*d* prepared for each input port are input to the rotation priority selector 21-1*c*. This output port number uniquely determines the output port which gained the connection right last time.

The main arbiter refers again to the connection request status table 21-1*a*, and turn on the corresponding input signal line 21-1*e* of the rotation priority selector 21-1*c* for the logic queue to be selected.

The rotation priority selector 21-1*c* searches the input signal line 21-1*e* in certain fixed order starting from the output port number next to the output port number take out of the previous connection right gained output port number saving register 14-1*b*, and selects the logic queue corresponding to the turned-on input signal line 21-1*e* searched first.

The rotation priority selector executes the above process for all input ports, and selects only one output port to which each input port requests connection, and ignores all connection requests to the others than the selected destination output port. If no logic queue can be selected in the higher priority service class, it executes this process for the lower priority service class.

Next, for the competition arbitration process, the output port numbers for each output port and each service class saved in the previous connection right given output port number saving register 21-1*c* are input to the rotation priority selector 21-1*c*. This input port number uniquely determines the input port which gets the connection right to that output port last time.

Referring to the connection request status table 21-1*a* of the higher priority service class, the main arbiter turns on the corresponding input signal line of the rotation priority selector 21-1c for the input port which requests to connect to a certain output port, taking account of only the connection destination selected by the candidate selection process executed before.

The rotation priority selector 21-1c searches the input signal line 21-1e in certain fixed order starting from the output number next to the output port number and the input port number related to its service class taken out of the previous connection right given output port number saving register 21-1b, and selects the logic queue corresponding to the turned-on input signal line 21-1e searched first.

The rotation priority selector executes the above competition arbitration for all output ports, and selects the connection right.

If any output port is not given the connection right, the rotation priority selector refers to the connection request status table 21-1a of the lower priority service class and executes the similar competition arbitration process.

After the competition arbitration is executed for all candidates in the connection request status table 21-1a or when all input ports are given the connection right to their destination outputs, the competition arbitration signal transmitter 21-3 sends the sub-arbiter 14 of each input buffer section the competition arbitration signal 31 stating whether the connection right is given to the input port that requests connection to an output port and to which output port the connection right is given. (Step S205 in FIG. 22)

The input port numbers that gives the connection right to respective output port are then overwritten in the corresponding service class column in the previous connection right gained input port number saving register 21-1b. At the same time, the output port numbers which each input port gained the connection right are overwritten in the corresponding service class column in the previous connection right gained output port number saving register 14-1b. In FIG. 22, the variable C is a timer variable similar in FIG. 12, and it will be set to a predetermined value Y after the competition arbitration signal is notified, and then it will decrement at every predetermined time (step S207 in FIG. 2), and when the variable C becomes zero, the candidate selection will be executed.

Figure 23:
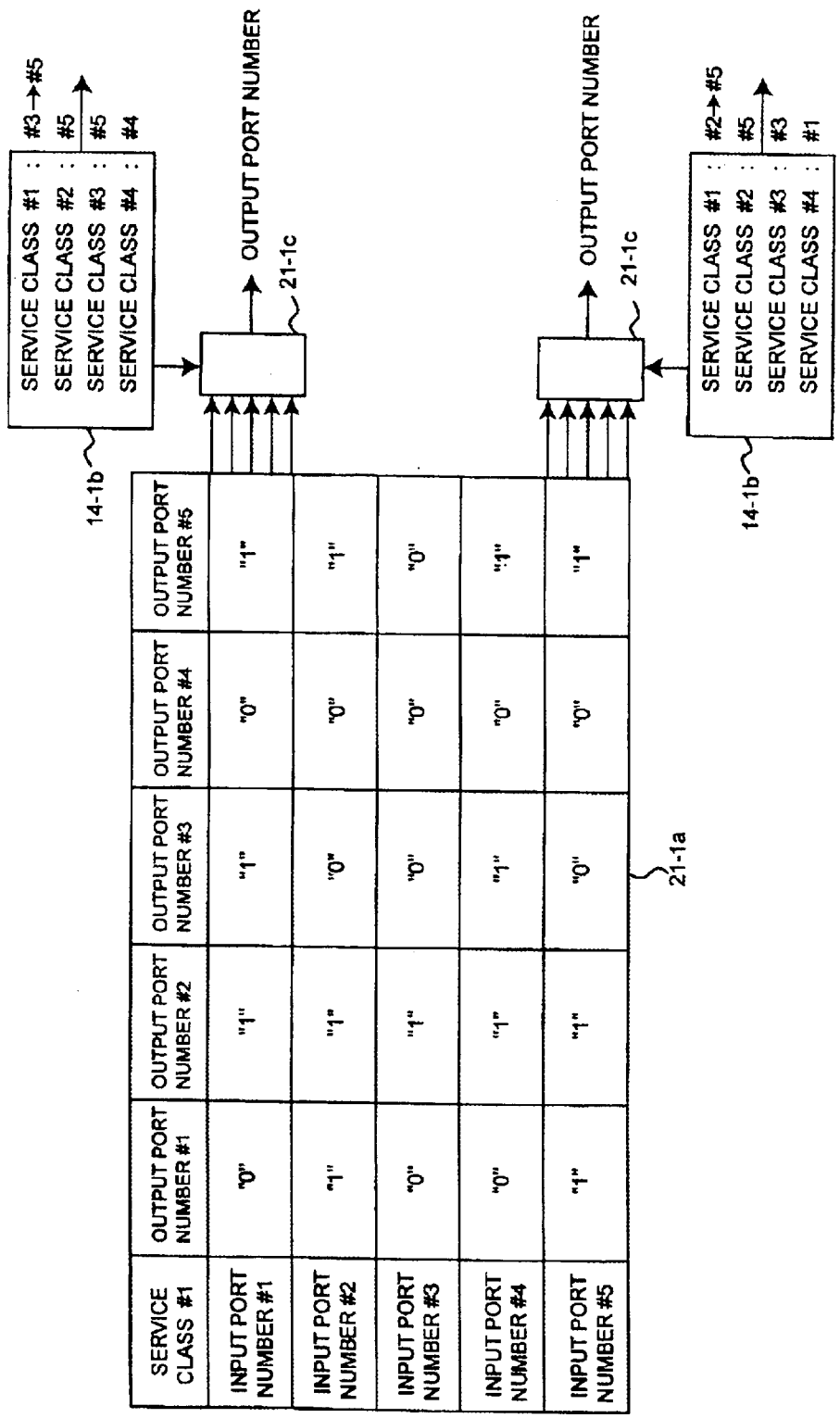
FIG. 23 is a state diagram explaining the candidate selection process in the second embodiment of the present invention.
Figure 25:
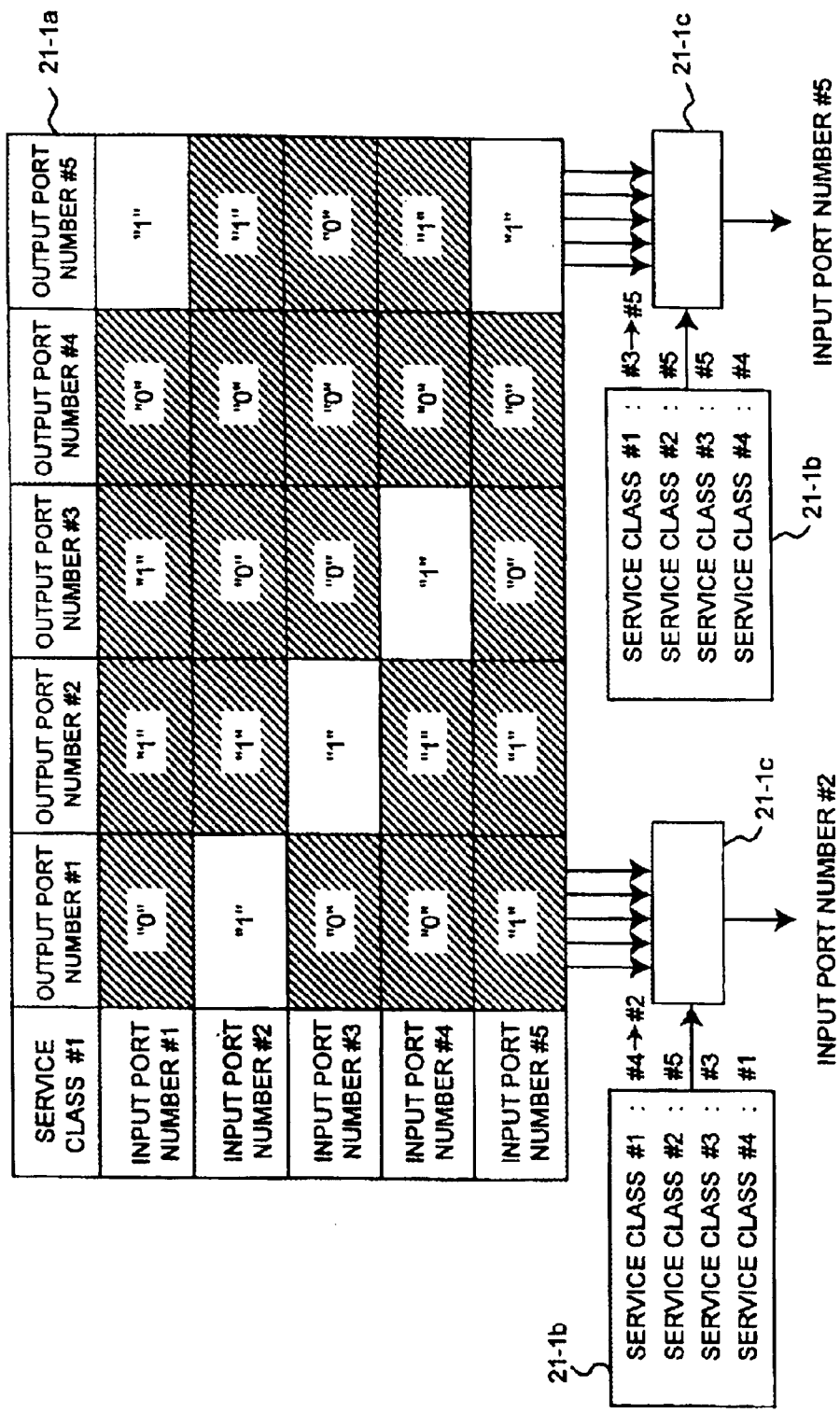
FIG. 25 is a state diagram explaining the competition arbitration process in the second embodiment of the present invention.
Figure 26:
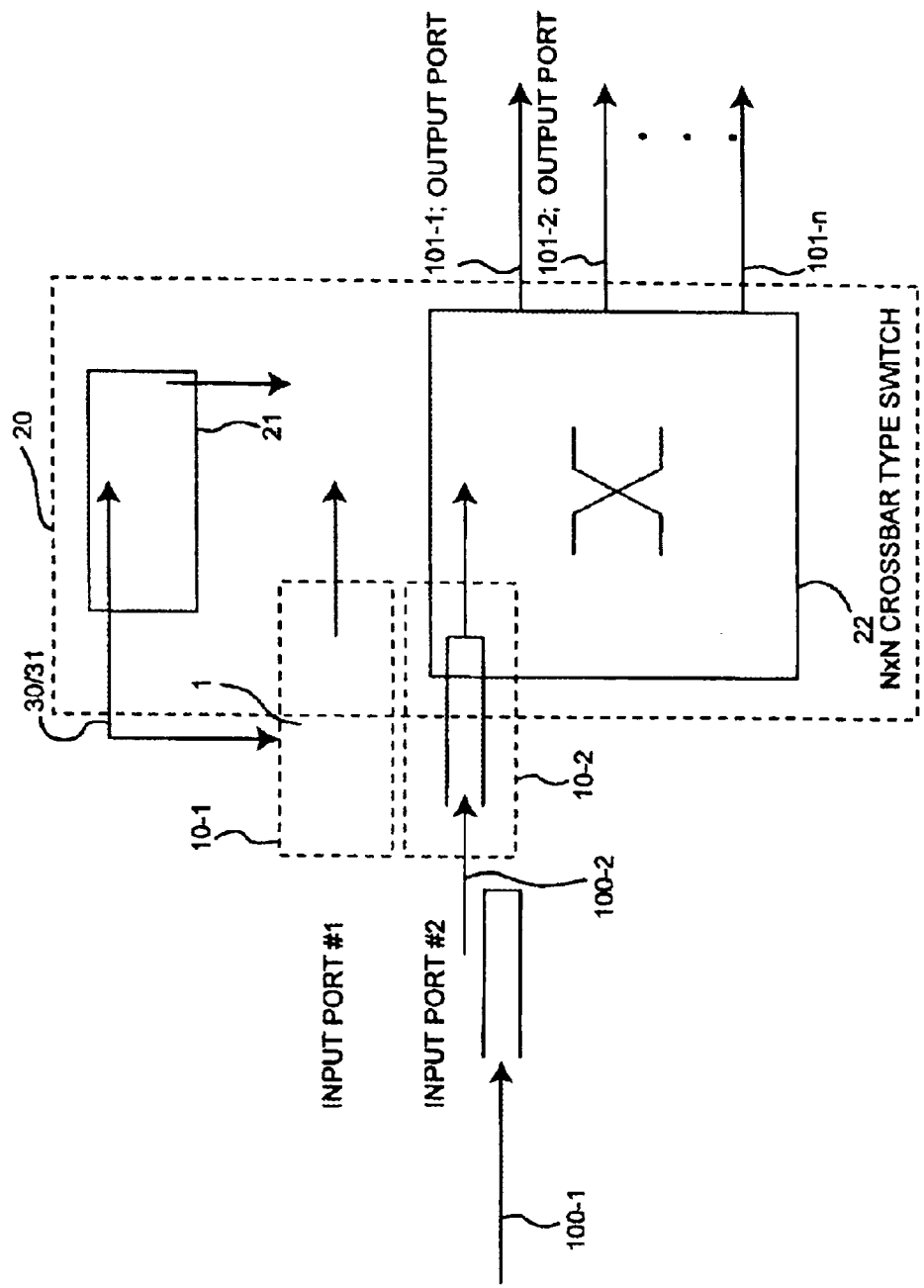
FIG. 26 is a block diagram showing the configuration of a conventional input buffer type switch and FIG. 27 is a state diagram explaining the operation of a conventional input buffer type switch.
Figure 27:
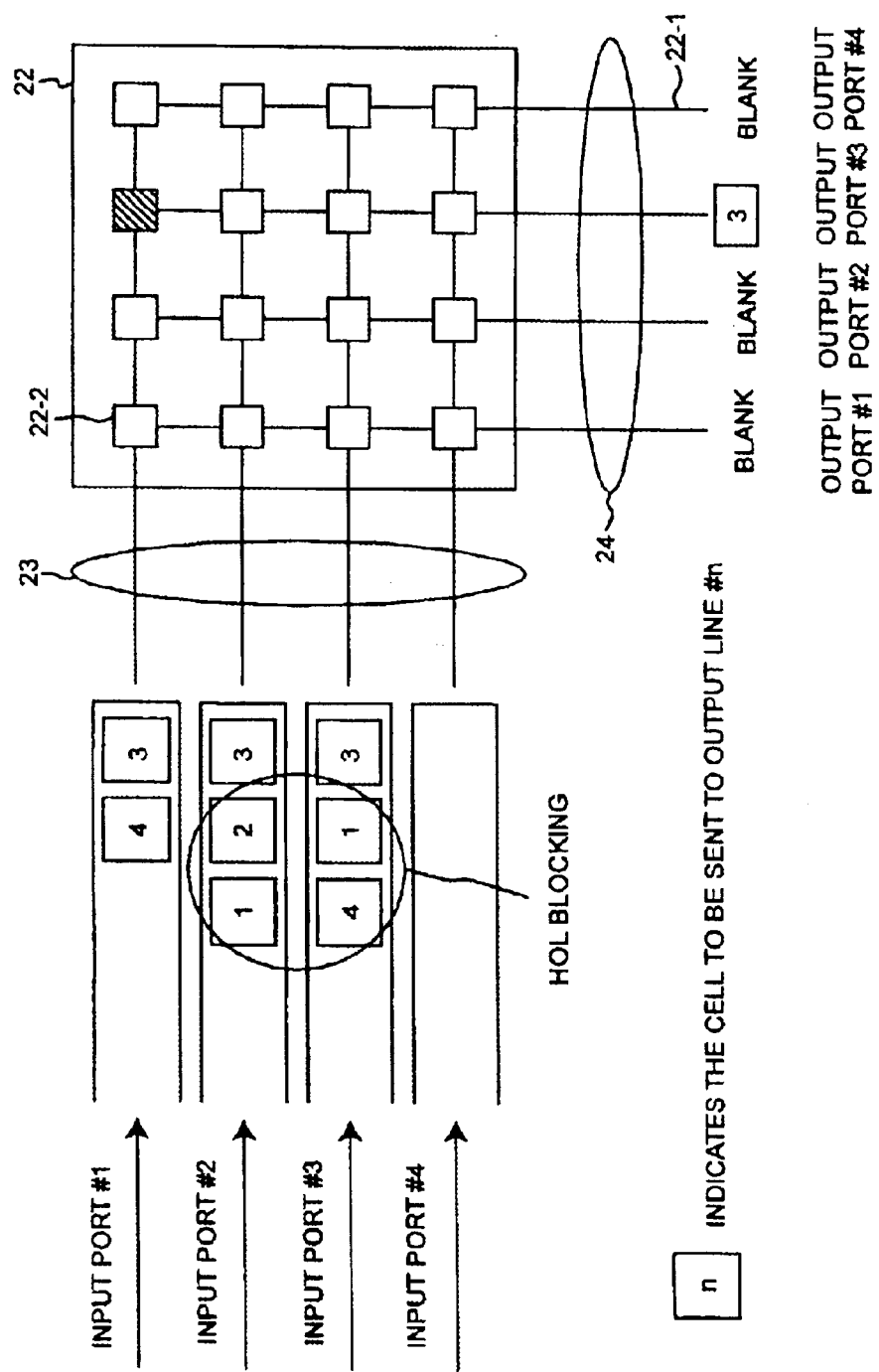

FIG. 23, FIG. 24 and FIG. 25 illustrate an example of the candidate selection and competition arbitration executed by the connection right determiner 21-1 of the main arbiter 21 in the second embodiment of the present invention. For the brief explanation, the candidate selection and competition arbitration for the service class #1 will be explained. The rotation priority selector 21-1c is to search the input ports in the order of #1, #2, #3, #4, #5, #1, #2, . . . , or to search the output ports in the order of #1, #2, #3, #4, #5, #1, #2, . . . The priority will be lowered in the ascending service class order.

Referring to the connection request status table 21-1a, for the service class #1, the input port #1 can issue the connection request to the output ports #2, #3 and #5, and turns on the corresponding input signal line of the rotation priority selector 21-1c for respective destination output ports.

As the output port number assigned to the service class #1 saved in the connection right gained output port number register 14-1b prepared for the input port #1 is #3, the rotation priority selector 14-1c sets the destination output port #3 as a start point of rotation priority control.

Searching the destination output ports in the order of #4, #5, #1, #2, #3, the first searched turned-on input signal line is of the destination output port number #5, and the rotation priority selector 21-1c selects the destination output port #5 for the connection right destination (FIG. 23).

The above process is executed for other input ports, and one connection destination is determined for each input port (FIG. 24). The connection requests issued for the destination output ports that are not selected by this process will be ignored.

Referring to the connection request status table 21-1a with the candidate selection performed, the input ports #2 and #5 issue the connection request belonging to the service class #1 to the output port #5.

The corresponding input signal lines of the rotation priority selector 14-1c are set to the turned-on state.

As the input port number assigned to the service class #1 saved in the previous connection right given input port number register 21-1b is #3, the rotation priority selector 21-1c sets the destination output port #4 as a start point of rotation priority control.

Searching the input ports in the order of #4, #5, #1, #2, #3, the first searched turned-on input signal line is of the input port number #5, and the rotation priority selector 21-1c selects the input port #5 for the connection right source, and changes the service class #1 column to #5 in the previous connection right given input port number saving register 21-1b.

Likewise, the similar process is executed for the output port #1 and as a result, the connection right is given to the input port #2, and the service class #1 column is changed to #2 in the previous connection right given input port number saving register 21-1b (FIG. 25).

As described above, by limiting the notice from the input buffer 10-1 to 10-n to the information about whether a cell is stored or not, the communication capacity between the input buffer 19-1 to 10n and the main arbiter 21 can be reduced.

The present invention is applicable not only to an ATM switching system handling a fixed length ATM cell, but also to a packet exchanging system handling a variable length packet, and thus the modifications are possible as described hereinbefore.

As described hereinbefore, according to the present invention, the switch control system of ATM switching system to exchange an ATM cell between an input port and an output port; the input buffer type ATM switching system comprising a crossbar type switch which exchanges an ATM cell between specific input port and output port, an input buffer section provided for each input port, and an arbiter section to determine to which input port the connection right to a certain output port is given, or which cross point of a crossbar type is to be turned on/off; when all input buffers hold the connection right to respective output port and the cells to be sent to all output ports, all the connection request destinations to be selected by each input buffer in the next candidate selection process will be different, and no blocking will occur.

Because, in the present invention, the logic queue positioned next to the queue which gained the connection right to a certain output port last time is taken as a start point of rotation priority control which checks whether a logic queue holds cells in the predetermined order, and selects the logic queue holding the cell searched first, in the candidate selection process to select the logic queue issuing the connection request to an output port out of the plurality of logic queues provided in said input buffer section to store input cells for each output port and each connection, when determining the logic queue in said input buffer section from which a cell is transferred. Further, the logic queue positioned next to the queue which gained the connection right to a certain output port last time is taken as a start point of said rotation priority control which checks whether a connection request is issued from respective input buffer in the predetermined order and selects the input buffer issuing the connection request searched first, in the competition arbitration process to determine the input buffer to be given the connection right, when the connection requests issued by a plurality of input buffers are concentrated to the same output port.

In accordance with the present invention, the blocking occurrence rate can be further decreased by making it possible to request a plurality of connection destinations at a time in the candidate selection process. Further, by limiting the notice from the input buffer to the information about whether a cell is stored or not, the communication capacity between the input buffer and the main arbiter can be reduced.

What is claimed is:

1. An ATM switching system comprising:

two or more input ports;

an output port;

an input buffer section corresponding to each input port, said input buffer section including a logical queue, the logical queue corresponding to the output port;

an arbiter section that determines to which input port an output port connection right is given;

a crossbar type switch through which an ATM (asynchronous transfer mode) cell is exchanged between the input ports and the output port;

a candidate selection processing unit that performs a candidate selection process that determines which of the logical queues issuing a connection request will be given the output port connection right, the candidate selection process including searching the logical queues in a first predetermined order for a logical queue that holds a predetermined number of cells, the search beginning with a first logical queue located next in the first predetermined order to a second logical queue, said second logical queue being the last logical queue to have obtained an output port connection right, and selecting the logical queue first found to hold the predetermined number of cells; and a competition arbitration processing unit that performs a competition arbitration process that determines which of the input ports issuing a connection request will be given an output port connection right when two or more of the input ports are selected during the candidate selection process to connect to the same output port at the same time the competition arbitration process including searching the input ports in a second predetermined order for the input port belonging to the highest priority class, the search beginning with a first input port located next in the second predetermined order to a second input port, said second input port being the last input port to have obtained an output port connection right, and selecting the input port belonging to the highest priority class.

2. The ATM switching system of claim 1, wherein:

said input buffer sections repeatedly execute said candidate selection process;

said input buffer sections assign an order to said plurality of logical queues selected by said candidate selection process, and notify said arbiter section of said order;

said arbiter section executes said competition arbitration process in the assigned order of candidates and determines each output port connection right; and said arbiter section returns the result of said competition arbitration process to said input buffer sections, and then resets information about said connection request sent from said input buffer sections.

3. The ATM switching system of claim 1, wherein said arbiter section grants, in the assigned order of candidates, the connection right to the connection request issued by the input port having the highest priority service class, when connection requests issued by input ports belonging to different priority service classes compete for the same output port in said competition arbitration process.

4. The ATM switching system of claim 1, wherein:

said input buffer sections repeatedly execute said candidate selection process;

said arbiter section:

searches through all connection requests recorded in an information table, said information table indicating which input port issued the connection request to which output port;

executes said competition arbitration process; and returns the result of said competition arbitration process to said input buffer section, and then resets said information table.

5. The ATM switching system of claim 1, wherein said arbiter section:

includes an information table, each information table storing information about connection requests issued by input ports for a particular service class;

first executes said competition arbitration process using the information table corresponding to a highest priority service class, and then executes said competition arbitration process using the information table of each of lower priority service classes in sequential order of decreasing priority;

repeats, for each information table, said candidate selection process and said competition arbitration process either a predetermined number of times, or until the logical queue issuing the connection request is empty according to said information table.

6. The ATM switching system of claim 1, wherein said candidate selection process is executed for the logical queues belonging to the lower priority service class after said candidate selection process is executed for the logical queues belonging to the higher priority service class, said candidate selection process either being repeated a predetermined number of times, or being repeated until no candidate is available to be selected from the logical queues of the higher priority service class.

7. The ATM switching system of claim 1, wherein:

said arbiter section has an information table that indicates which logical queue is eligible to obtain a connection right to which input buffer section;

said each input buffer sections notifying said arbiter section when they are eligible to obtain a connection right when more than a predetermined number of cells are stored in the logical queue of said input buffer sections;

said arbiter section records the notification of an input buffer section's eligibility to possibility of obtain the connection right in a corresponding part of said information table, executes said candidate selection process for each input port, and determines the destination output port to which the connection request will be granted at each input port;

and repeatedly executes said competition arbitration process to grant said output port connection right to one of said input ports.

8. The ATM switching of claim 1, wherein:

an information table is provided for each service class;

said candidate selection process and said competition arbitration process are executed sequentially starting from the information table of the higher priority service class, whereby each output port connection right is determined;

said candidate selection process and competition arbitration process are executed for the information table of the lower priority service class, after said candidate selection process and competition arbitration process are repeated a predetermined number of times for said information table of the higher priority service class, or after the logic queue issuing the connection request is empty according to said information table of the higher priority service class.

9. The ATM switching system of claim 1, wherein:

said candidate selection process and competition arbitration process are executed at fixed time intervals; and said output port connection right once obtained is held until the next time said candidate selection process and competition arbitration process are executed.

10. An ATM switch comprising:

an input buffer section installed for each of two or more input ports;

an arbiter section that determines to which input port an output port connection right will be given, and which cross point of a crossbar type switch is to be turned on or off;

a switch exchange that exchanges an ATM cell between an input port and an output port; and two or more logical queues, wherein a first logical queue is located next to a second logical queue, said second logical being the last logical queue to have obtained an output port connection right, and said first logical queue being taken as a start point of rotation priority selection control, said rotation priority control searching sequentially in a predetermined order to find which of the logical queues holds a predetermined number of cells, and selecting the first logical queue found to hold the predetermined number of cells, in a candidate selection process that selects one or more logical queues that are eligible to obtain an output port connection right.

11. The ATM switch of claim 10, wherein said arbiter section has a controller that takes as a start point of said rotation priority control a first input port located next to a second input port that last gained an output port connection right, and searches the input ports in a predetermined order for the input port having the highest priority and selects the input port having the highest priority, in a competition arbitration process that determines which input port will be given a connection right, when more than one connection requests are issued from said input ports to the same output port.

12. The ATM switch of claim 10, said arbiter section having an information table indicating which logical queue may compete to gain the connection right to which input buffer section, said each input buffer section notifying said arbiter section of its eligibility to obtain a connection right when more than a predetermined number of cells are stored in each logical queue, said arbiter section receiving said notification, recording the eligibility to obtain a connection right in a corresponding part of said information table, executing said candidate selection process for each input port, and executing said competition arbitration process to give said output port connection right to one of said two or more input ports.

13. The ATM switch of claim 10, said input buffer section comprising:

a plurality of logical queues that store cells for each output port;

a cell information detector that extracts identification information from the header of an arrived cell, determines a service class and a destination output port to which said cell belongs, and stores cells in an appropriate logic queue;

a sub-arbiter section; and a cell transfer section that extracts a leading cell in the logical queues, and sends the leading cell to said switch exchange through an information signal transmission line;

said sub-arbiter section including a logic queue selector comprising:

a cell storage status control memory that stores the information about the cells to be sent to the output ports;

a memory that records which of the output ports last obtained the connection right last time for each service class;

a rotation priority selector that searches a plurality of candidates in a predetermined order, and selects the candidate which first meets a predetermined condition; and a logical queue determiner that notifies said cell transmitter of the information about the logic queue to send a cell;

a connection request signal transmitter that generates and transmits a connection request signal informing said arbiter section of the information about the logical queue selected by said logical queue selector; and a competition arbitration signal receiver that receives the information, determined by said arbiter section about which output port is to be connected to which input port; and wherein a first logical queue located next to a second logical queue that last gained an output port connection right is taken as a start point of said rotation priority selector in the rotation priority controller, in the candidate selection process to select one of the logical queues issuing a connection request to a certain output port.

14. The ATM switch of claim 10, said arbiter section comprising:

means for determining the connection right;

means for receiving a connection request signal from each input buffer section and recording information in a connection request status control memory prepared for each service class about which input port is eligible to obtain the connection right to a particular output port and service class; and means for generating and transmitting to said input buffer section a competition arbitration signal, said competition arbitration signal including information about which output port is to be connected to which input port, the determination of which is made by said connection right deciding means;

said connection right deciding means storing the information about which input port issues a connection request to which output port in said connection request status control memory;

a memory in which are saved numbers identifying the input ports which last obtained a connection right for each output port and service class;

means for selecting rotation priority that searches a plurality of candidates in a predetermined order, and selects the first candidate found to meet a predetermined condition;

means for determining which input ports are to be connected to specific output ports, and for transmitting information about its determination to said switch exchange; and wherein a second logical queue located next to a first logical queue that last gained an output port connection right is taken as a search start point of the rotation priority section means, in a competition arbitration process that selects which of the input ports will obtain a connection right, when the connection requests from said plurality of input ports are directed to the same output port.

* * * * *